(12) United States Patent
Rey

(10) Patent No.: US 10,759,468 B2
(45) Date of Patent: Sep. 1, 2020

(54) POWER STEERING DEVICE WITH SEALED PROTECTIVE CASING

(71) Applicant: JTEKT EUROPE, Irigny (FR)

(72) Inventor: Laurent Rey, Villeurbanne (FR)

(73) Assignee: JTEKT EUROPE, Irigny (FR)

(*) Notice: Subject to any disclaimer, the term of this patent is extended or adjusted under 35 U.S.C. 154(b) by 255 days.

(21) Appl. No.: 15/749,362

(22) PCT Filed: Jul. 29, 2016

(86) PCT No.: PCT/FR2016/051983
§ 371 (c)(1),
(2) Date: Jan. 31, 2018

(87) PCT Pub. No.: WO2017/021637
PCT Pub. Date: Feb. 9, 2017

(65) Prior Publication Data
US 2018/0229760 A1    Aug. 16, 2018

(30) Foreign Application Priority Data
Jul. 31, 2015 (FR) ..................... 15 57390

(51) Int. Cl.
| B62D 5/04 | (2006.01) |
| B62D 3/12 | (2006.01) |
| B62D 21/11 | (2006.01) |

(52) U.S. Cl.
CPC .......... B62D 5/0406 (2013.01); B62D 3/126 (2013.01); B62D 5/0403 (2013.01);
(Continued)

(58) Field of Classification Search
CPC .... B62D 5/0406; B62D 3/126; B62D 5/0403; B62D 5/0421; B62D 5/0409; B62D 21/11
(Continued)

(56) References Cited

U.S. PATENT DOCUMENTS

| 3,777,589 A * | 12/1973 | Adams | .................. B62D 3/123 |
| | | | 74/498 |
| 5,097,918 A * | 3/1992 | Daido | .................. B62D 5/0466 |
| | | | 180/446 |

(Continued)

FOREIGN PATENT DOCUMENTS

| DE | 10 2006 057 665 A1 | 6/2008 |
| DE | 10 2012 222264 A1 | 7/2013 |
| WO | WO-0126950 A2 * | 4/2001 ............... B62D 3/12 |

OTHER PUBLICATIONS

Nov. 9, 2016 Search Report issued in International Patent Application No. PCT/FR2016/051983.
(Continued)

*Primary Examiner* — Jacob D Knutson
(74) *Attorney, Agent, or Firm* — Oliff PLC

(57) ABSTRACT

A power-steering device intended to be fitted on a vehicle-receiving structure, such as a cradle, the device including a rack as well as at least one actuator subassembly including at least one assistance motor, one drive gear, as well as one load-bearing structure that carries the assistance motor and is arranged to support and guide the drive gear and the rack relative to one another, the device further including one containment casing that is separate from the actuator subassembly and is formed by connecting at least one base and one bell housing, which are attached to one another by a sealed joint such that the containment casing prevents the actuator subassembly from being exposed to water splashes, dust and salt spray from the outside environment when the power-steering device is in place on the receiving structure of the vehicle.

15 Claims, 12 Drawing Sheets

(52) U.S. Cl.
CPC .......... *B62D 5/0421* (2013.01); *B62D 5/0409* (2013.01); *B62D 21/11* (2013.01)

(58) Field of Classification Search
USPC ........................................ 180/443, 444, 446
See application file for complete search history.

(56) References Cited

U.S. PATENT DOCUMENTS

| | | | | |
|---|---|---|---|---|
| 5,251,717 | A * | 10/1993 | Klosterhaus | B62D 5/22 180/428 |
| 5,590,732 | A * | 1/1997 | Sugino | B62D 5/0427 180/412 |
| 2005/0016789 | A1* | 1/2005 | Asada | B62D 15/02 180/444 |
| 2008/0006471 | A1* | 1/2008 | Nakamura | B62D 5/0403 180/444 |
| 2011/0303480 | A1* | 12/2011 | Shimizu | B62D 1/16 180/444 |
| 2012/0329592 | A1 | 12/2012 | Sun et al. | |
| 2015/0274198 | A1* | 10/2015 | Sato | B62D 3/12 180/444 |
| 2017/0113719 | A1* | 4/2017 | Ohashi | B62D 3/12 |

OTHER PUBLICATIONS

Nov. 9, 2016 Written Opinion issued in International Patent Application No. PCT/FR2016/051983.

* cited by examiner

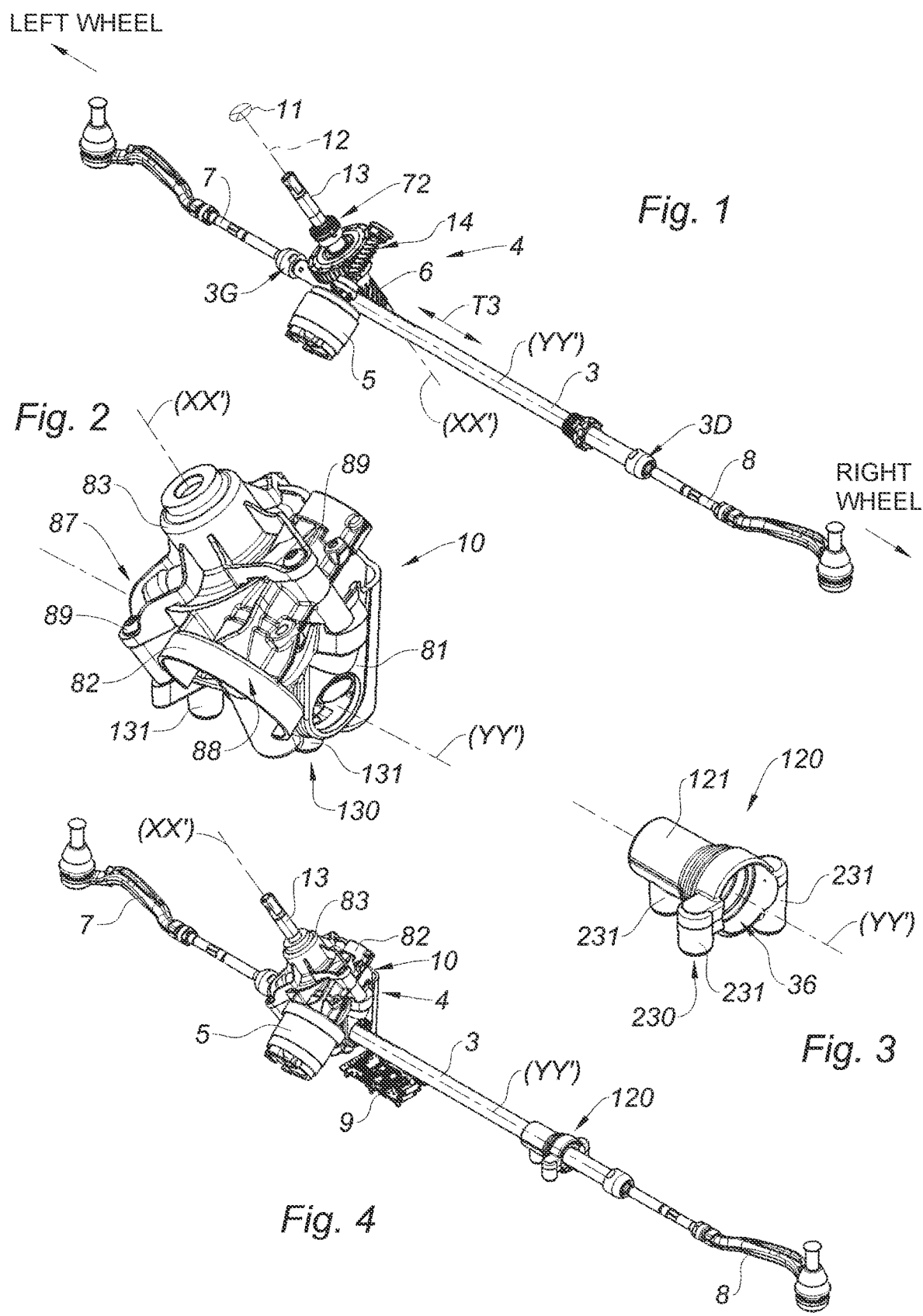

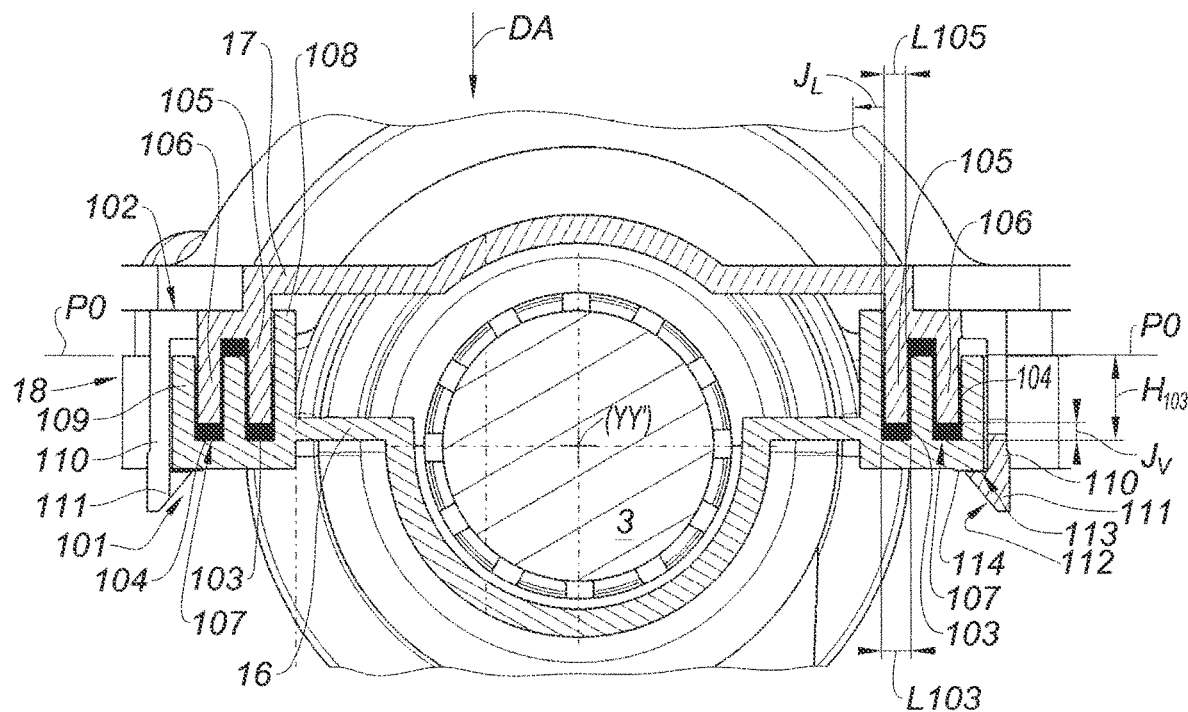
Fig. 16  A-A
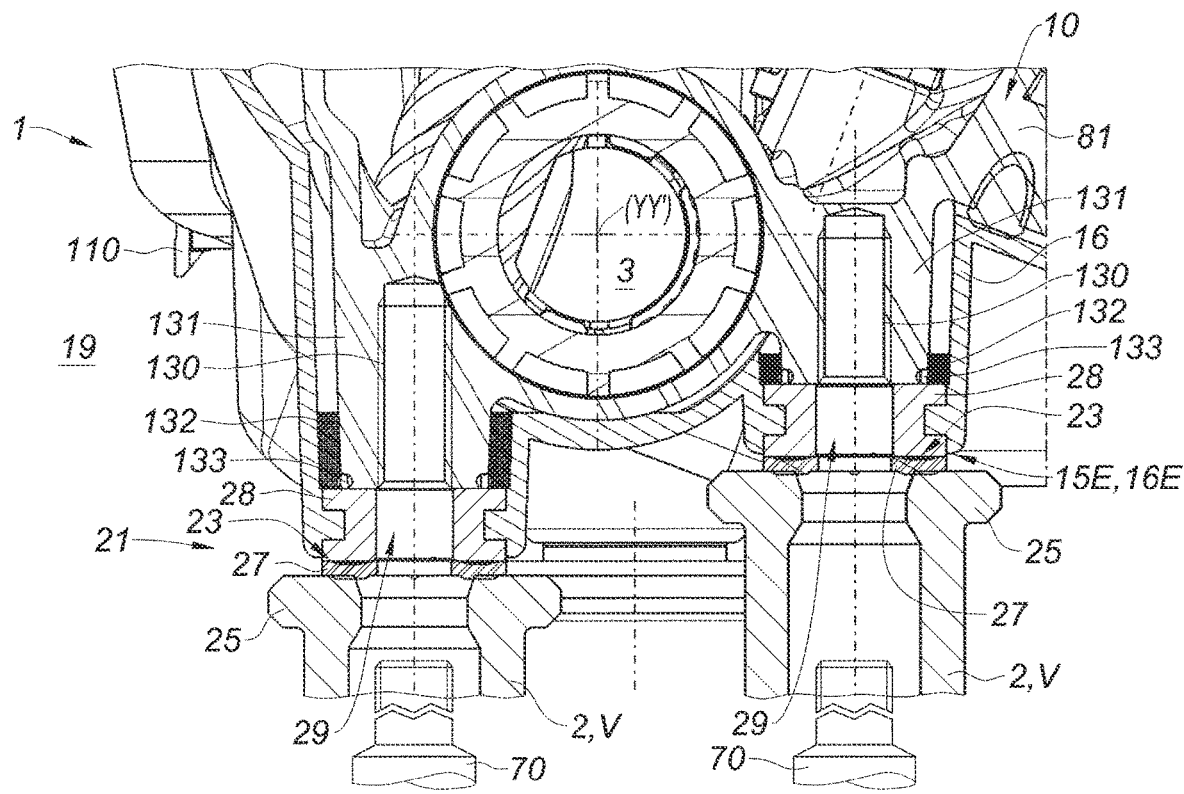
Fig. 17  B-B

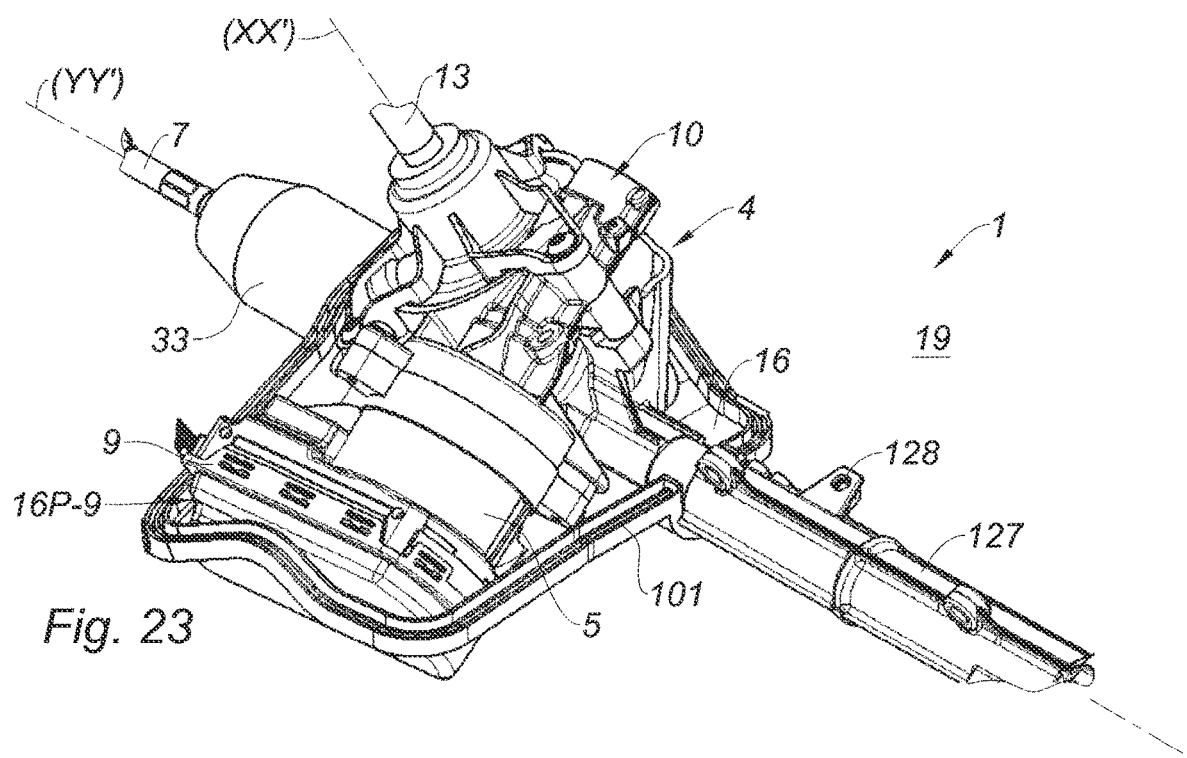
Fig. 23
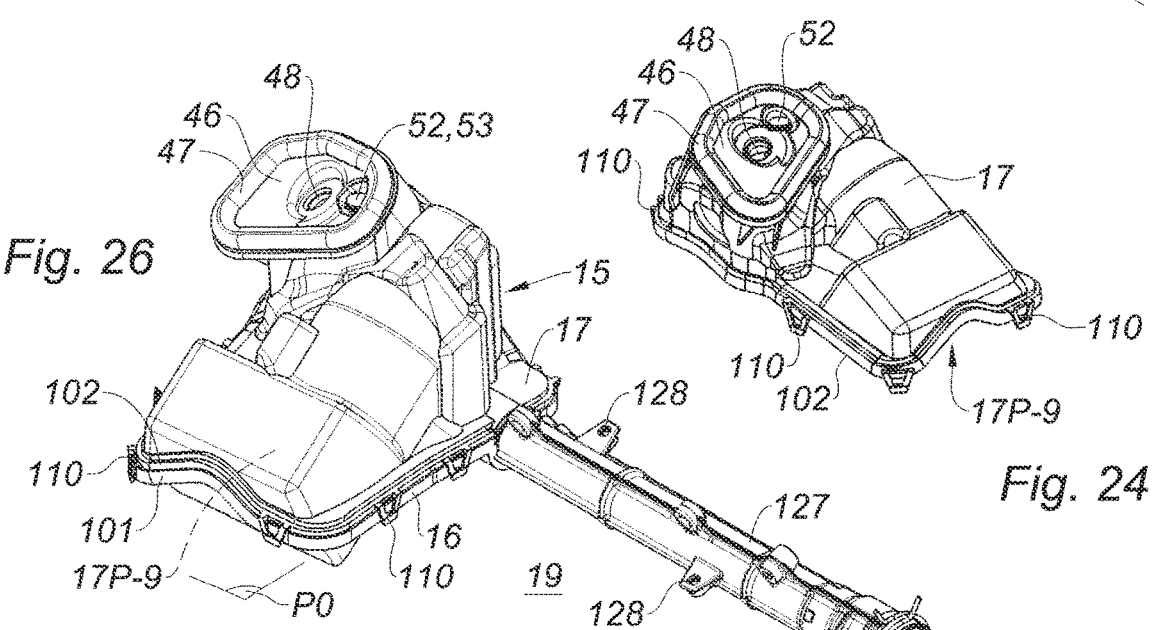
Fig. 26
Fig. 24
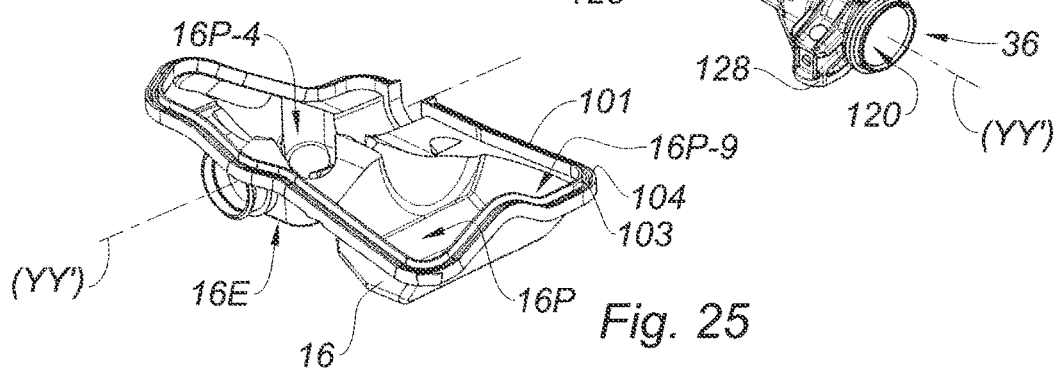
Fig. 25

POWER STEERING DEVICE WITH SEALED PROTECTIVE CASING

The present invention relates to power steering devices for vehicles, and more particularly to electric power steering devices.

The current power steering devices generally comprise an assembly of numerous modules, which correspond to the different functions that have been added over time to improve the steering devices.

Thus, within a power steering device, there is generally a basic mechanism, ensuring a manual steering control function, said basic mechanism comprising a steering column which is driven by a steering wheel and which meshes by means of a drive pinion on a steering rack, said rack being guided in translation in a steering casing and linked to the steered wheels by steering tie rods.

There is also an assist motor, generally associated to a gear reducer which enables said assist motor to act on the rack or on the steering column, the set thus ensuring a motorized steering control function. The gear reducer is then generally housed in a reducer casing, attached and fastened on the steering casing, whereas the assist motor is contained in a motor casing which is, in turn, attached and fastened on the reducer casing.

Furthermore, there is generally a torque sensor, whose function is to measure the torque exerted by the driver on the steering wheel, said torque sensor being housed in a sensor casing which may be for example fastened on the reducer casing, so as to be crossed by the steering column.

Thus, each time a new function intended to improve the steering device is added, it has been necessary to graft on the already existing assembly, and more generally on the steering casing, an additional specific casing, containing the members (assist motor, gears of the reducer, torsion bar and magnetic circuit of the torque sensor, etc.) necessary to the fulfillment of the new function.

Of course, in order to guarantee the protection of said members, and in particular the maintenance of the lubrication of the movable mechanical members of the steering device, it is necessary to provide for sealing rings at each junction interface between two casings.

Yet, the multiplication of the constitutive parts of the power steering device makes the operations of assembling said device more and more long, complex and expensive.

Furthermore, by multiplying the connections between distinct casings, and therefore by multiplying the number of corresponding sealing rings, the likelihood that a mounting error is made, and in particular that a seal is damaged during the assembly of the device, is increased, which therefore increases the risks of occurrence of defects on the production line.

Similarly, because of the multiplicity of connections between casings, the risks of subsequent failure of the device are also increased, and in particular the risks of occurrence of a leakage at one of said connections, once said device is in service.

Moreover, the known casings assemblies remain relatively liable to corrosion because water and salt spray (that is to say the cloud of salt water droplets suspended in the air and which is formed for example when the vehicle circulates on a snow-covered road treated with salt, or on a road located proximate to the sea) tend to seep into the steering device at the interfaces between the casings.

Furthermore, the fastening screws which retain a casing on another casing are generally made of a metallic material which is distinct from the metallic material constituting the casing (typically, screws made of steel are used to assemble aluminum casings), such that it may be observed sometimes, in the presence of water and a fortiori in the presence of salty water (salt spray), a galvanic corrosion effect at the fasteners of the casings, which may lead eventually to a weakening and even to a breakage of the assembly, and/or to a failure of the steering device.

Consequently, the objects assigned to the invention aim to overcome the aforementioned drawbacks and to propose a new power steering device which has an improved structure which protects effectively and durably the members of the steering, which is particularly resistant to chemical and mechanical external attacks, while being simple and inexpensive to manufacture.

The objects assigned to the invention are achieved by means of a power steering device intended to be installed on a receiving structure belonging to a vehicle, such as a cradle carrying a running gear of said vehicle, said device comprising a steering rack, as well as at least one subassembly, called «actuator subassembly», which is intended to maneuver said rack and which comprises to this end at least one assist motor, one drive member, such as a drive pinion, arranged to be driven by the assist motor and to engage the rack in order to be able to drive the latter in displacement, as well as a carrier structure which carries the assist motor and which is arranged to support and guide the drive member and the rack relative to each other, said power steering device being characterized in that it also comprises a containment shell, which is distinct from the actuator subassembly, and which is formed by the combination of at least one first shell portion, called «base», and one second shell portion, called «bell-housing», which are attached and fastened to each other by a sealed junction so as to surround the actuator subassembly with a protective envelope which isolates said actuator subassembly from the external environment of the steering device, so that said containment shell prevents said actuator subassembly from being exposed to water projections, and to salt spray, when the power steering device is in place on the receiving structure of the vehicle.

It should be noted that the containment shell advantageously allows protecting the actuator subassembly, and more generally any member placed inside said shell, not only from the intrusion of liquids (water, salt spray droplets, but also any liquid foreign to the steering device and likely to be present in the environment of the shell, and in particular in the engine compartment, such as brake liquid, windshield washer liquid, engine oil, or fuel), but also from projections of solid particles.

In particular, the shell will offer a protection against dust (raised in particular when running on a dry road) and against the projections of aggregate, in particular projections of sand grains or salt grains (used to clear the snow from the roads or de-ice the roads).

Advantageously, the invention allows separating:
  on the one hand, the functions called «actuation» functions, said actuation functions firstly comprising the function of executing the mechanical maneuver of the steering strictly speaking, carried out in particular by the mechanical members which are the assist motor, the drive pinion and the rack, said actuation functions also comprising the function of holding and guiding said mechanical maneuvering members, which is fulfilled by the carrier structure, and said actuation functions finally comprising, where appropriate, the function of controlling and servo-controlling the power steering, which may be carried out in particular by one or several sensor(s) associated to a calculator, and, on the other hand, the sealing function, and more particularly the function of protection against humidity, water projections and salt spray, which sealing function is fulfilled in general, and even exclusively, by the protective containment shell, since said containment shell covers the actuator subassembly in its entirety, so that said actuator subassembly is placed inside a sealed protective enclosure, which prevents the external surfaces of said subassembly from being directly exposed to the atmosphere which surrounds the steering device, to the extent that the walls of the containment shell, which delimit said enclosure, form a barrier, in extra thickness, all around said actuator subassembly.

It should be noted that it becomes thus possible to separately optimize, according to the requirements related to their specific functions, the actuator subassembly on the one hand, and the containment shell on the other hand, by dissociating the design and the manufacture of these two distinct elements.

In particular, since the actuator subassembly is henceforth sheltered inside the containment shell, it is no longer necessary for said actuator subassembly to have intrinsically a high level of sealing and/or a particular resistance to corrosion.

Consequently, it is possible, without any risk to the longevity and reliability of the steering device, to simplify the arrangement of the actuator subassembly, to reduce the number of parts constituting the latter, in particular by suppressing seals, and thus to make said actuator subassembly lighter and more compact, less expensive, and more simple to assemble.

It is also possible to widen the choice of materials that may be used to make the carrier structure of said actuator subassembly, so as for example to favor lighter and more robust materials.

Similarly, resorting to an additional outer containment shell, that is to say distinct from the actuator subassembly, allows achieving a high-quality sealing at a lower cost, into one single operation during which said shell is closed and sealed, by attaching the bell-housing on the base and by creating the sealed junction between said bell-housing and said base.

This is made possible in particular because the sealing is mainly achieved by integrally formed solid walls, which correspond respectively to the walls constituting the base and the bell-housing and which, intrinsically, are therefore not subjected to seepage, unlike the junctions of the prior art which use screws and attached seals to assemble the casings to each other.

Similarly, thanks to the invention, the number of static junctions (that is to say junctions between two fixed structural parts) to be sealed is significantly reduced, since it is sufficient, in practice, to ensure the production of one (single) sealed junction, preferably continuous, between the base and the bell-housing, instead of having to multiply the sealed junctions between the different casings.

In this respect, it should be noted that it is advantageously possible to provide, within the bell-housing and the base, for specific arrangements, intended to improve the mechanical strength and the sealing quality of said sealed junction, and this without these arrangements, specific to the containment shell, having any incidence on the arrangement of the carrier structure or on the manufacturing operations (and in particular on the machining operations) of said carrier structure, and more generally of the actuator subassembly.

Thus, it is possible to optimize the sealing of the containment shell still without complicating the design or the manufacture of said actuator subassembly.

Furthermore, the use of such a containment (over)shell allows dissociating the choice of the material(s) used to form the shell, and more particularly the bell-housing on the one hand and the base on the other hand, from the choice of the material(s) used to construct the actuator subassembly, and in particular the carrier structure of said actuator subassembly, and therefore using different materials to form the shell on the one hand, and the carrier structure (framework) on the other hand.

Thus, it is in particular possible to consider making all or part of the containment shell of a plastic material relatively fine, advantageously tight, light and insensitive to corrosion, whereas a metallic material, more rigid and more robust, may be preferred, such as steel or aluminum, for the carrier structure of the actuator subassembly.

Moreover, by subdividing the containment shell into at least, and even exactly, two shell portions, namely a base and a bell-housing which caps said base, not only the manufacture of said shell is simplified, in particular by molding, but also the operations of assembling the power steering device in its entirety.

Indeed, it is advantageously possible to begin by disposing the bare base on an assembly table such as a jig or «marble», so that the base is open and accessible from the top to receive the actuator subassembly.

In turn, said actuator subassembly may advantageously be pre-assembled and pre-set separately, on another station of the manufacturing line, before being attached, positioned and fastened in said base.

Hence, we will have a good accessibility to set up the actuator subassembly within the base, and proceed, where appropriate, to some necessary settings of said actuator subassembly (positioning of the parts, settings of the clearances, adjustment of the stroke of the rack, etc.), in particular with respect to the base, while the shell is still open.

The shell will then be closed by attaching and by fastening the bell-housing on the base, over the actuator subassembly, then by forming the sealed junction between said bell-housing and said base, for example by bonding.

The assembly method of the steering device will thus be greatly simplified and standardized.

In particular, this simplification and this standardization will allow considerably reducing the risk of failure inherent to said assembly method due to the fact that, on the one hand, the parts to assemble (bell-housing, base and actuator subassembly) could have been checked each separately before assembly, upstream of the manufacturing chain and, on the other hand, the assembly operations to perform are few in number and relatively not too complex.

Finally, the separation of the steering device into an inner actuator subassembly on the one hand and into an outer containment shell on the other hand allows considering the creation of different ranges of steering devices, for example intended to different vehicle models, which would preserve the same actuator subassembly, common to the different vehicle models, but which would use different containment shells, adapted to the configuration and to the dimensions of the concerned different vehicle models, and more particularly adapted to the receiving structure specific to each of said vehicle models.

Herein again, by enabling the use of the same actuator subassembly for multiple vehicle models, the invention allows standardizing generally the manufacture of the steering devices.

Other objects, features and advantages of the invention will appear in more detail upon reading the following description, as well as with reference to the appended drawings, provided only for an illustrative and non-restrictive purpose, among which:

FIG. 1 illustrates, according to a perspective view, an example of a rack-type power steering mechanism for a power steering device according to the invention.

FIG. 2 illustrates, according to a perspective view, an assembly of casings forming a carrier structure according to the invention.

FIG. 3 illustrates, according to a perspective view, an example of a planet guide bearing, intended to complete the translational guidance of the rack away from the carrier structure.

FIG. 4 illustrates, according to a perspective view, a portion of the power steering device according to the invention which corresponds to the assembly and guide configuration of the mechanism represented in FIG. 1, within the carrier structure of FIG. 2 and the planet bearing of FIG. 3.

FIG. 16 illustrates, according to a sectional view perpendicular to the longitudinal axis (YY') of the rack, the device of FIGS. 6 and 13 to 15, and more particularly an example of arrangement of the sealed junction by which the bell-housing is fastened to the base.

FIG. 17 illustrates, according to a sectional view perpendicular to the longitudinal axis (YY') of the rack, the fastening of a device of FIGS. 6 and 13 to 15 on a cradle-type receiving structure of the vehicle.

Figure 6:
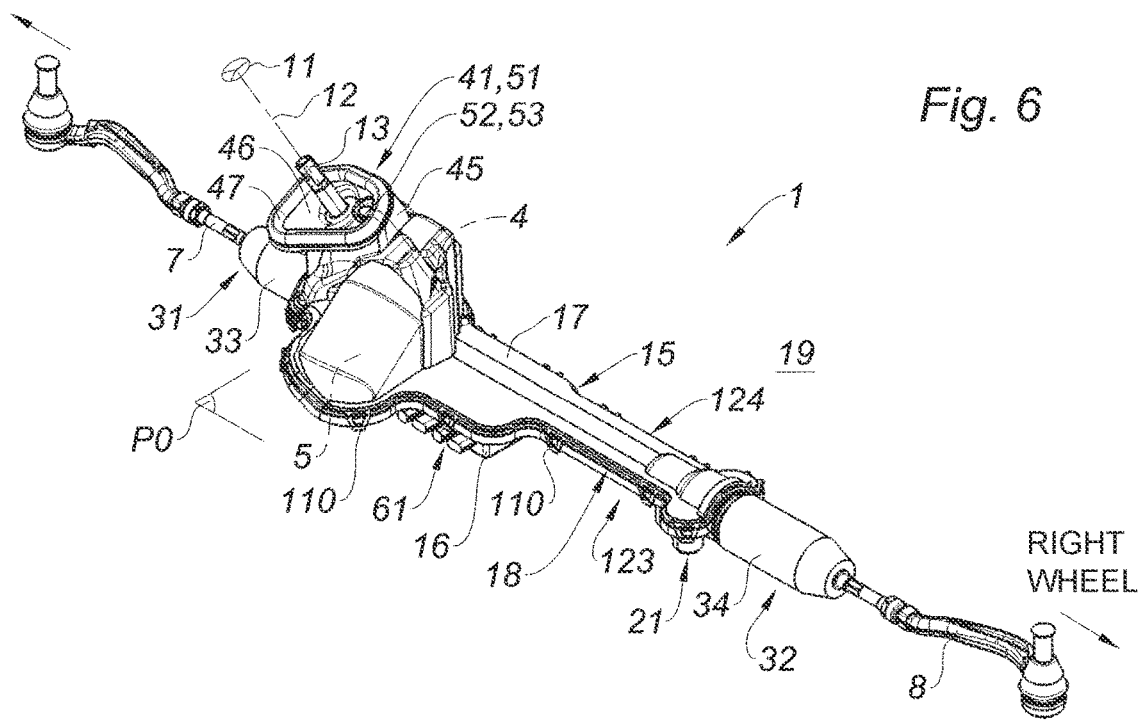
FIG. 6 illustrates, according to a perspective overall view, the first variant of a power steering device according to the invention, corresponding to the device represented in FIG. 5 within which a bell-housing which covers the carrier structure has been added and closed on the base, so as to create and seal the containment shell.
Figure 20:
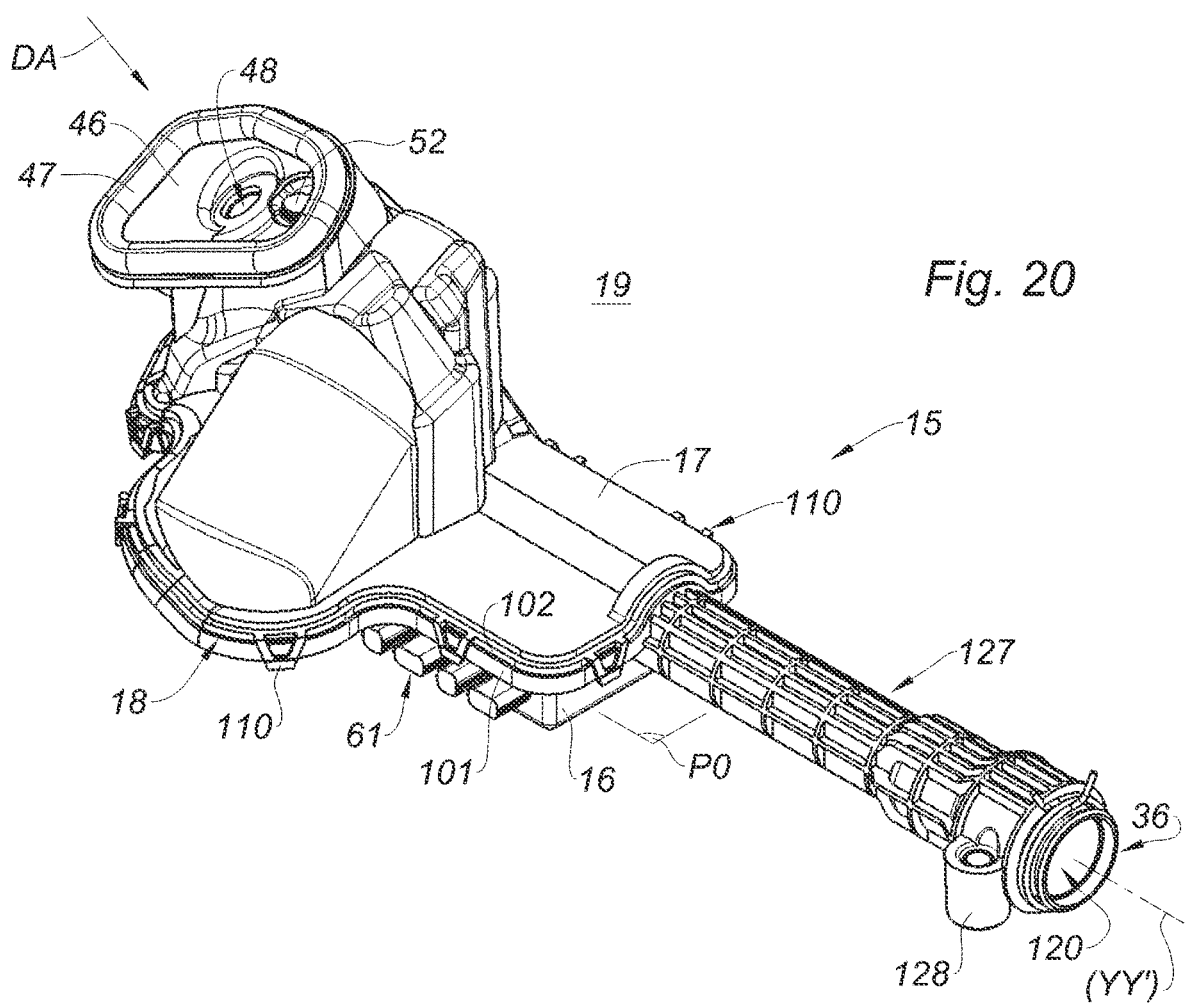
FIG. 20 illustrates, according to a perspective view, a second variant of a steering device according to the invention implementing the base of FIG. 19 as well as a bell-housing whose extent, in particular the extent according to the longitudinal direction of the rack, is reduced relative to the extent of the bell-housing of the first variant of a steering device of FIG. 6.
Figure 21:
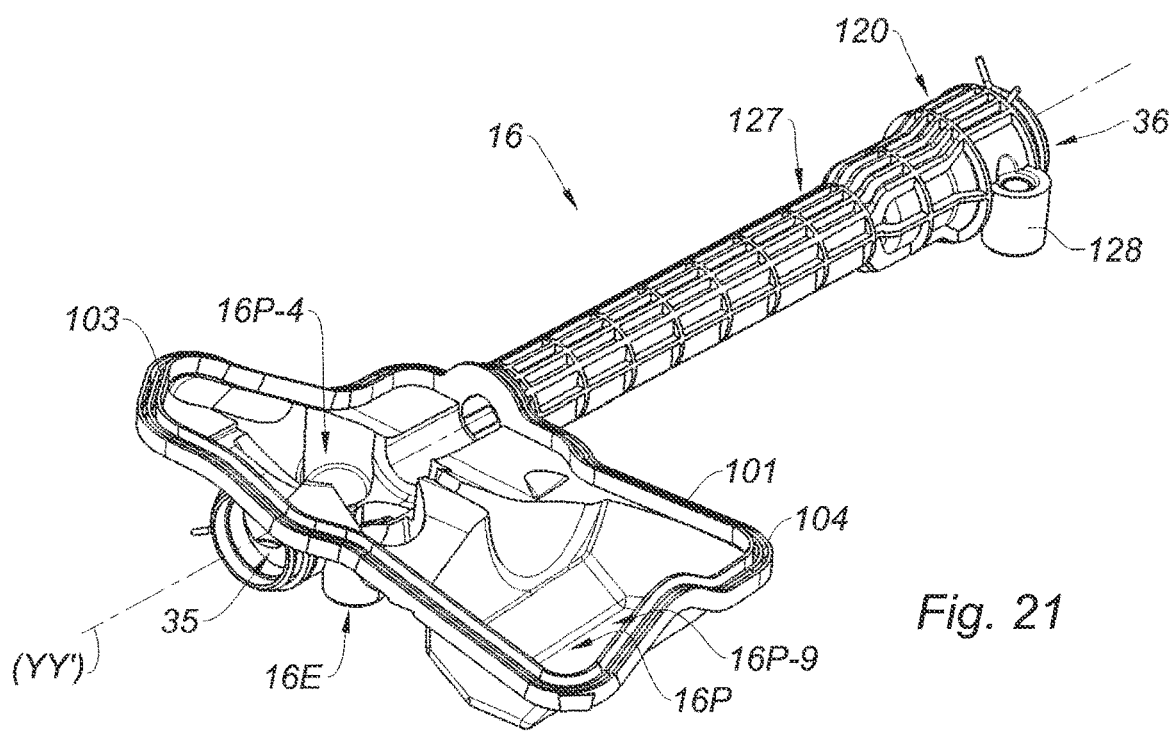
FIG. 21 illustrates, according to a perspective view, a base for a third variant of a power steering device according to the invention, in which the planet guide bearing is embedded in a tubular extension of said base, and the steering calculator leaning against the assist motor.
Figure 22:
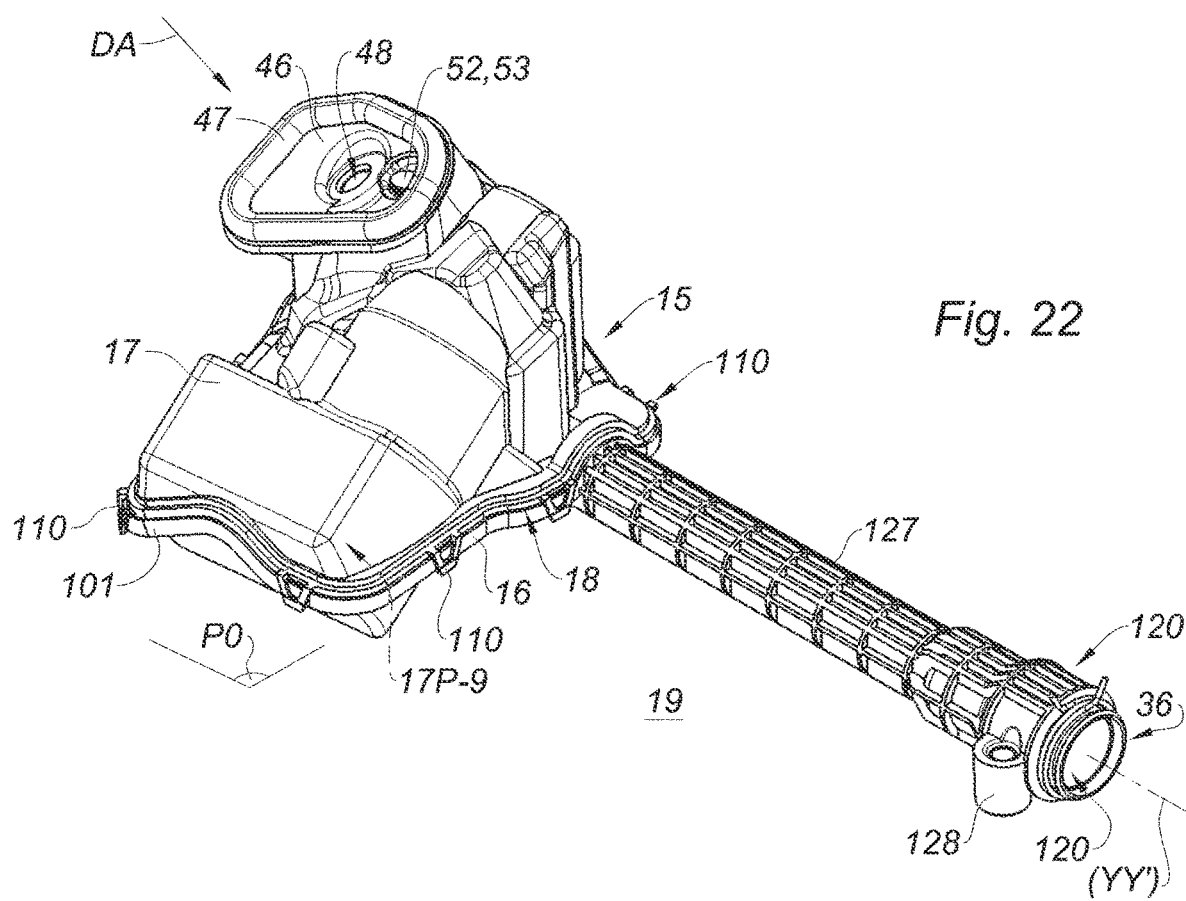

FIG. 22 illustrates, according to a perspective view, a third variant of a steering device according to the invention implementing the base of FIG. 21 as well as a bell-housing which includes a specific location for the calculator leaning against the motor, and whose extent according to the longitudinal direction of the rack is reduced relative to the extent of the bell-housing of the first variant of the steering device of FIG. 6 and relative to the extent of the bell-housing of the second variant of the steering device of FIG. 20.

FIG. 23 illustrates, according to a partially cutaway perspective view, a fourth variant of the steering device according to the invention, within which the planet guide bearing is located in a tubular extension attached on the base, and within which the steering calculator is leaning against the assist motor just as in the third variant of the steering device of FIG. 22.

FIGS. 24, 25 and 26 respectively illustrate, according to perspective views, the bell-housing, the base, and the entire containment shell which are used within the fourth variant of the steering device of FIG. 23.

Figure 27:
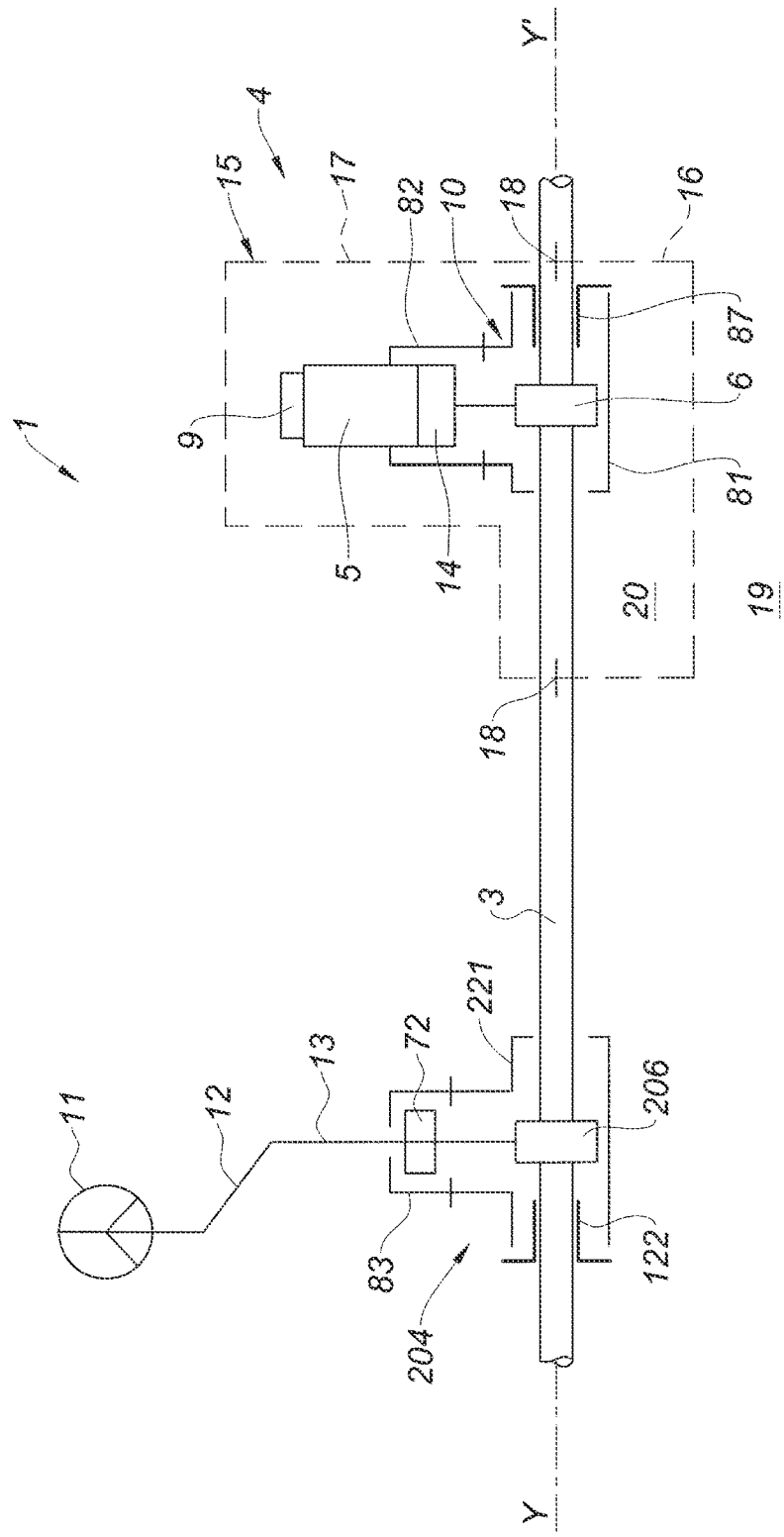

FIG. 27 illustrates, according to a schematic view, a variant of implementation of the invention within a double-pinion power steering device.

The present invention concerns a power assist device 1.

Said device 1 is intended to be installed on a receiving structure 2 belonging to a vehicle V, preferably a motor vehicle.

For example, said receiving structure 2 may be a cradle, which is fastened to the chassis of the vehicle V and which carries a running gear of said vehicle, preferably the front running gear of the vehicle.

For the sake of description, the receiving structure 2, on which the power steering device 1 rests and is fastened, may therefore be assimilated to a cradle in the following.

Preferably, the cradle 2 will be disposed under the engine which serves to propel the vehicle, transversely to side members of the chassis which support said cradle.

Advantageously, the front running gear will carry the steered wheels (herein a right wheel and a left wheel) of the vehicle, which steered wheels having a yaw orientation (steering angle) controlled by the steering device 1.

Preferably, said steered wheels are also drive wheels, used for the propulsion (herein for the front-wheel drive) of the vehicle.

According to the invention, and as illustrated in particular in FIGS. 1, 4, 5, 12 to 14 and 18, the steering device 1 comprises a steering rack 3 (hereinafter «rack»), as well as at least one subassembly, called «actuator subassembly» 4, which is intended to maneuver said rack 3.

Said actuator subassembly 4 comprises to this end, as shown in particular in FIG. 1, at least one assist motor 5, as well as a drive member 6, such as a drive pinion 6, arranged to be driven by the assist motor 5 and to engage the rack 3 in order to be able to drive in displacement said rack 3.

It should be noted that, in a particularly preferred manner, the rack 3 is guided in (rectilinear) translation T3, so as to be able to slide, according to a direction of translation (YY'), within the steering device 1, and more generally relative to the receiving structure 2 of the vehicle, which is considered fixed (in the reference frame of the vehicle V).

Said direction of translation (YY') corresponds advantageously to the longitudinal axis (YY') of said rack, and will be therefore assimilated to said longitudinal axis in the following, for the sake of description.

Furthermore, said direction of translation (YY') will also preferably correspond to the transverse lateral direction (left-right) of the vehicle.

Moreover, in a manner known per se, the rack 3 is advantageously linked, respectively at its left end 3G and at its right end 3D, to steering tie rods 7, 8, respectively a left tie rod 7 and a right tie rod 8, each allowing to transmit the displacement of the rack 3 to a stub axle which is yaw orientable (relative to the vehicle) and which carries the corresponding steered wheel (left wheel, right wheel).

Moreover, the steering device 1 will be managed by a calculator 9, which will elaborate, according to predetermined assist laws, advantageously stored in a non-volatile memory of said calculator 9, an assist setpoint that said calculator 9 will apply to the assist motor 5.

According to the invention, the actuator subassembly 4 also comprises, as shown in particular in FIG. 4, a carrier structure 10 which carries the assist motor 5 and which is arranged to support and guide the drive member 6 and the rack 3 relative to each other.

Moreover, the steering device 1 also preferably comprises, as schematized in FIGS. 1, 6, 12 and 18, a steering wheel 11 which enables the driver to maneuver the steering and which is carried by a steering column 12.

Preferably, the steering column 12 will enable a direct manual actuation of the rack 3, and will directly engage the rack 3 by means of a drive pinion 6 fastened on said steering column 12.

To this end, the actuator subassembly 4 will preferably comprise an input shaft 13 which is intended to be coupled to the steering column 12 (and which therefore constitutes an extension of said steering column 12 through the carrier structure 10).

The guiding axis (XX') according to which said input shaft 13 extends will be noted (XX').

Moreover, it should be noted that the invention may apply to a steering mechanism called «single-pinion» mechanism, such as the mechanism illustrated in FIGS. 1, 6, 12 and 18, that is to say a mechanism within which the assist motor 5 engages the steering column 12 itself (or, in an equivalent manner, an extension of said steering column 12 within the carrier structure 10), for example by means of a gear reducer 14, such as a worm wheel and a worm screw reducer, so that both the steering wheel 13 and the assist motor 5 act on the rack 3 via the same drive pinion 6.

Nonetheless, the invention may also apply to other types of steering mechanisms, and in particular to a mechanism called «double-pinion» mechanism, within which the assist motor 5 acts on the rack 3 at a point distinct and distant from the steering column 12, for example by means of a second drive pinion, called «auxiliary pinion» 206, distinct and distant from the first drive pinion 6 fastened to the steering column 12, or by means of a ball screw transmission which engages the rack 3 away from said first drive pinion 6.

According to the invention, and as shown in particular in FIGS. 6, 12 to 16, 18, 20, 22 and 26, the power steering device 1 also comprises a containment shell 15, which is distinct from the actuator subassembly 4, and which is formed by the combination of at least one first shell portion, called «base» 16, and one second shell portion, called «bell-housing» 17, distinct from the base 16, said base 16 and said bell-housing 17 being attached and fastened to each other by a sealed junction 18 so as to surround the actuator subassembly 4 with a protective envelope which isolates said actuator subassembly from the external environment 19 of the steering device, so that said containment shell 15 prevents said actuator subassembly 4 from being exposed to water projections and to salt spray (coming from the external environment 19), and more generally to liquid projections, and where appropriate to dust or aggregate projections, and in particular to salt projections (coming from the external environment 19), when the power steering device 1 is in place on the receiving structure 2 of the vehicle.

As illustrated in particular in FIGS. 6, 12, 14, 16, 18, 20, 22, 26, the base 16 will preferably form a lower pedestal of the steering device 1, which pedestal is intended to bear against the receiving structure 2 of the vehicle (by a lower outer face 16E of the base 16), and a face (herein an upper face) of which, intended to be covered by the bell-housing 17, opens toward the outside, in order to provide access (before the bell-housing 17 is attached and fastened on the base 16) to a hollow recess 16P which offers at least one (hollowed) location 16P-4 intended to accommodate, at least partially, the actuator subassembly 4.

Said location 16P-4 for an actuator subassembly 4 will preferably have a shape substantially mating that of said actuator subassembly 4, so as to facilitate the positioning and the holding of said actuator subassembly 4 within the containment shell 15, relative to the base 16.

Preferably, the bell-housing 17 will form an upper portion of the shell 15, intended to be orientated upwards of the vehicle, opposite to the receiving structure 2, and which will cap the base 16 from above, so as to mask the hollow recess 16P (and more particularly the location 16P-4) and the actuator subassembly 4 placed beforehand in said recess 16P (more particularly in said location 16P-4).

The initial partitioning of the shell 15 into separate (at least) one base 17 and one bell-housing 16, and the proposed arrangement according to which the base 16 forms a lower pedestal and the bell-housing 17 forms an upper cover, will facilitate in particular the «flattened» assembly of the steering device 1, then the mounting of said device 1 in the vehicle V.

The external environment 19 of the steering device 1 comprises in general all the members and volumes which do not belong to the steering device 1 and which surround said steering device 1 outside the shell 15.

More particularly, the steering device 1 being placed in a cavity of the vehicle, called «receiving cavity», which forms an "inner" volume of the vehicle which is located within the overall volume occupied by the vehicle V, and which preferably corresponds to the engine compartment 43 in which lies the engine which is used to propel the vehicle, the external environment 19 of the steering device 1 comprises in particular the atmosphere of said receiving cavity (in this instance the atmosphere which fills the engine compartment 43) as well as all the members of the vehicle (such as the engine, the brake circuit, the cooling circuit, the windshield washer circuit, the engine oil circuit, the fuel supply circuit, etc.) distinct from the steering device 1 and which are located in said receiving cavity or in neighboring volumes which communicate with said receiving cavity, such that said members are likely to release, for example in the case of a leakage, solid particles (dust, filings) or liquids (fuel, engine oil, brake liquid, windshield washer liquid, etc.) in the receiving cavity, around the steering device 1.

The receiving cavity (the engine compartment 43) opening preferably onto the outside of the vehicle V, and more particularly onto the road on which the vehicle circulates, the environment 19 of the steering device 1 also comprises the external atmosphere which surrounds the vehicle V.

Thus, the atmosphere in which is immersed the steering device 1, and a fortiori the steering device 1 itself, will be exposed to foreign bodies such as solid particles (dust, filings, salt) and liquids (water, engine oil, fuel, brake liquid, cooling liquid, windshield washer liquid, etc.) which are potentially polluting, abrasive or corrosive, coming from the other members of the vehicle and/or from the external atmosphere of the vehicle.

In particular, the steering device 1 will be thus exposed to water projections, to aggregate projections or to dust clouds (typically with a grain size larger than 5 µm), to salt projections coming from the road and/or from the wheels, as well as to salt spray which possibly burdens the atmosphere in the vicinity of the vehicle, and in particular to salt spray which develops between the road and the understructure of the vehicle.

Advantageously, the containment shell 15 forms a protective envelope, which surrounds and delimits an enclosure 20, that said shell 15 advantageously makes inaccessible at least to water projections and to salt spray, and preferably to all the foreign bodies formed by solid particles (dust, filings, salt) and/or liquids (water, salt spray, engine oil, fuel, brake liquid, cooling liquid, windshield washer liquid, etc.), coming from the outside 19 of the steering device 1.

Thus, said shell 15 ensures a protective function, in particular a sealing function (and consequently a protective function against corrosion), which allows protecting from the intrusion of solid and/or liquid foreign bodies (as described hereinabove) all the members of the steering device 1 which are sheltered in said shell 15, inside the enclosure 20.

Advantageously, as said hereinabove, the invention allows separating the protective function (sealing, in particular anti-corrosion, function), herein assigned to the containment shell 15, from the mechanical support, guide and drive functions of the movable members of the steering device 1, which support, guide and drive functions are herein assigned to the actuator subassembly 4 which is sheltered in the enclosure 20 delimited by said containment shell 15, and more particularly which are assigned to the carrier structure 10 which somehow forms the rigid, preferably metallic, framework of said actuator subassembly 4.

This complementarity therefore allows specializing and optimizing the corresponding structures of the steering device 1 according to the function exclusively intended to said structures.

Advantageously, the containment shell 15 forms, where appropriate in cooperation with the receiving structure 2 against which said shell 15 bears once the steering device 1 is mounted and fastened in the vehicle V, a screen or a barrier, around the actuator subassembly 4, said screen being interposed (in thickness) between said actuator subassembly 4 and the external environment 19, and more particularly between said actuator subassembly 4 on the one hand, and the road and the steered wheelhouses on the other hand, so as to separate the actuator subassembly 4 from the external environment 19.

The presence of the containment shell 15, which forms a screen which masks in particular the actuator subassembly 4 from the external environment 19, thus advantageously prevents the enclosure 20 from communicating with the external atmosphere of the vehicle, or at least prevents said enclosure 20 from communicating directly and freely with the external environment to the vehicle, and in particular with the atmosphere of the engine compartment 43 in which lies the steering device 1, such that the actuator subassembly 4, and more particularly the carrier structure 10, is confined in the enclosure 20 and thus remains inaccessible to water projections, to dust, or to salt (or to salt spray) which come from the external environment 19, and more particularly which come from the windshield, from the road, or from the wheelhouses which open laterally on either side of the engine compartment 43.

Thanks to the enveloping arrangement of the containment shell 15, no surface (in particular no metallic surface) of the actuator subassembly 4, and in particular no surface (in particular no metallic surface) of the carrier structure 10, is directly exposed to the external environment 19, that is to say left without protection of the shell 15, such that no projection of (liquid) water, no runoff of water (coming from example from the windshield) or of any other liquid (for example in the case of a leakage of engine oil or leakage of fuel), no salt spray, and no dust can reach the actuator subassembly 4, and in particular the carrier structure 10, inside the enclosure 20.

Thus, the containment shell 15 provides an «incoming» sealing by preventing the penetration of liquid water, salt spray, dust, or any other liquid or solid foreign body in the enclosure 20, which avoids the fouling, and especially the corrosion of the actuator subassembly 4.

As an indication, the steering device 1, and more particularly the containment shell 15, may be arranged and sized so as to be able to resist a penetration of liquid water brought to a pressure equal to or higher than 2 bars, 3 bars, and even 4 bars (absolute bars, that is to say twice, three times, and even four times the atmospheric pressure), in order to resist «high-pressure» washer jets.

According to a possible implementation, the resistance of the containment shell 15, and in particular the sealing of the sealed junction 18, will be sufficient to resist a water jet (preferably hot water, at a temperature higher than 50° C. and even equal to 80° C.) brought to a pressure higher than 50 bars, preferably 100 bars, and emitted by a nozzle distant by less than 20 cm (typically between 80 mm and 100 mm) from said shell 15.

Similarly, the steering device 1, and more particularly the containment shell 15, may be arranged and sized so as to be able to resist a penetration of salt spray at a pressure comprised between 900 mbars and (at least) 1.2 bar (that is to say substantially at the usual atmospheric pressures), and even 1.5 bar.

Moreover, the containment shell 15 preferably provides an «outgoing» sealing, by preventing the grease-type lubricant, which is contained in the enclosure 20, and more particularly in the actuator subassembly 4, from escaping from the steering device 1.

Advantageously, the containment shell 15 will comprise functional interfaces 21, 22, 31, 32, 41, 51, 61 (detailed hereinafter and shown in particular in FIGS. 6, 17 and 18) which will enable exchanges between the enclosure 20, that is to say the inside of the shell 15, and the outside 19, beyond the limits of the shell 15, said exchanges being necessary to the set-up and to the proper operation of the steering device 1, that is to say to the normal interactions of the steering device 1 with the vehicle V.

Typically, these functional interfaces may enable: a stowage interaction enabling the fastening of the shell 15 on the receiving structure 2, a maneuvering interaction allowing to transmit to the wheels the (translational) movements of the rack 3, that is to say the displacements of the ends 3G, 3L of the rack 3 relative to the shell 15, a control interaction enabling the steering column 12 moved by the steering wheel 11 to control the input shaft 13 and therefore the steering angle and the steering force exerted on the steering, a connection interaction ensuring the electrical connections of the calculator 9 and of the assist motor 5, a breathing interaction enabling a pressure balance between the confined atmosphere of the enclosure 20 and the external atmosphere, in particular in the case of sudden variations of temperature related for example to a sudden cooling of the shell 15 caused by the passage of the vehicle in a body of water, and where appropriate a draining interaction allowing to drain outwardly from the enclosure 20 possible water condensates which would nevertheless form in said enclosure 20, in particular subsequently to a sudden cooling of the air contained in said enclosure 20.

Of course, the exchanges intentionally made possible by these functional interfaces 21, 22, 31, 32, 41, 51, 61 will be restricted, and somehow filtered, by the containment shell 15, so as to prevent the penetration of liquid water, salt spray or dust, as well as the leakage of lubricant, at the level of the interfaces.

In other words, the containment shell 15 will thus form a continuous screen around the enclosure 20, and therefore all around the actuator subassembly 4, which screen will break off only at the level of access orifices 29, 30, 35, 36, 48, 53 located within the functional interfaces 21, 22, 31, 32, 41, 51, 61, given that said functional interfaces will fulfill the airlock function, that is to say that will protect the access orifices so as to guarantee a selective access to the enclosure 20, which selective access will consist in authorizing the access to the enclosure 20 to enable the functional interactions necessary to the operation of the device 1 (in particular the connection passages and the movements of movable members of the steering), while preventing the access of said enclosure 20 to liquid water, salt spray and dust, or to any other solid and/or liquid foreign materials mentioned hereinabove, so as to avoid the intrusion of these disrupting or corrosive substances in the steering device 1 and the entry of said substances into contact with the members of the steering device 1 which are sheltered in the shell 15, such as the actuator subassembly 4.

To this end, the containment shell 15, and more particularly the functional interfaces 21, 22, 31, 32, 41, 51, 61 of said shell 15, may include, complementarily to the base 16 and to the bell-housing 17, auxiliary sealing elements 27, 28, 33, 34, 46, 47 in charge of ensuring the sealing of the shell 15 at the level of the functional interfaces.

Among the auxiliary sealing elements, preferably flexible, and for example made of elastomer, there may be found wiper seals or bellows 33, 34, capable of ensuring the sealing of the shell 15 despite the presence of members of the steering device 1 which are movably mounted relative to the shell 15, through the concerned functional interface, or static seals 46, 47 enabling a sealed coupling of the shell 15 to the vehicle V at said functional interfaces.

That being so, it should be noted that the base 16 and the bell-housing 17, which form together a rigid portion of the shell 15, that is to say a self-supporting portion of said shell 15, with a substantially invariable shape, will preferably constitute, in comparison with the functional interfaces, the largest portion of the containment shell 15, and will thus have a cumulative covering surface, around the enclosure 20, which represents most of the total surface covered by the set of the shell 15 and the functional interfaces around said enclosure 20.

In any case, the steering device 1 will therefore be arranged so that every opening of the containment shell 15 (which passes throughout the wall of said shell 15, across the entire thickness of said shell), and therefore more particularly every functional interface 21, 22, 31, 32, 41, 51, 61 of the device 1, is provided with auxiliary sealing elements which ensure, in cooperation with the base 16 and the bell-housing 17, the sealing of the shell 15, and therefore of the enclosure 20, at least with respect to liquid water and to salt spray, and even to dust or other solid or liquid foreign bodies, and this so as to avoid any direct exposure of the surfaces of the members contained in the enclosure 20, and more particularly any direct exposure of the surfaces of the actuator subassembly 4 and of the carrier structure 10, to the external environment 19.

Figure 12:
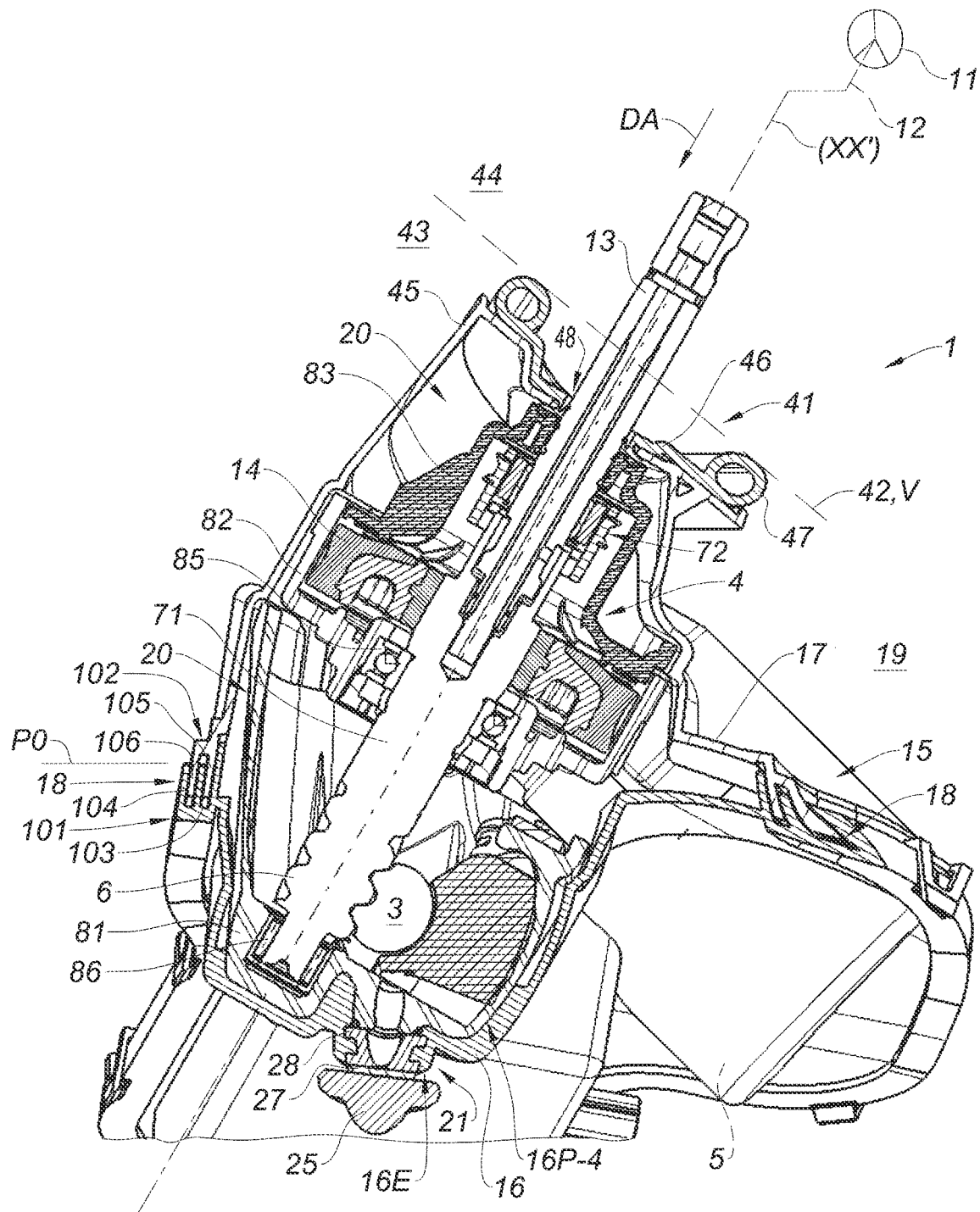
FIG. 12 illustrates a sectional view of the steering device of FIG. 6, in a sectional plane which is secant to the rack and which contains the guiding axis (XX') of the input shaft of the device, said input shaft being linked to the steering column.
Figure 13:
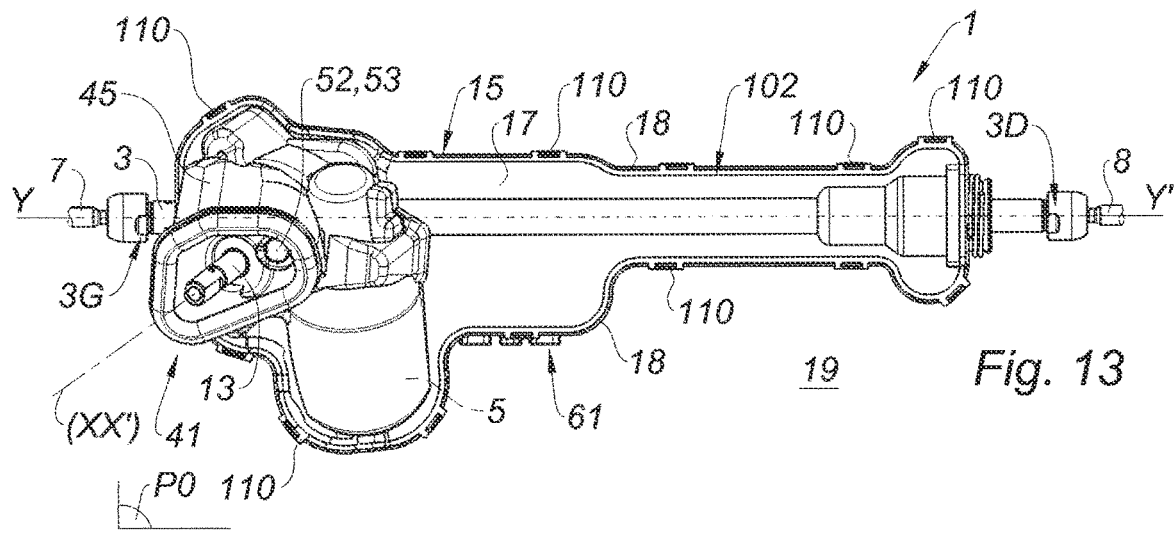
FIG. 13 illustrates, according to a top view, the steering device of FIGS. 6 and 12.
Figure 18:
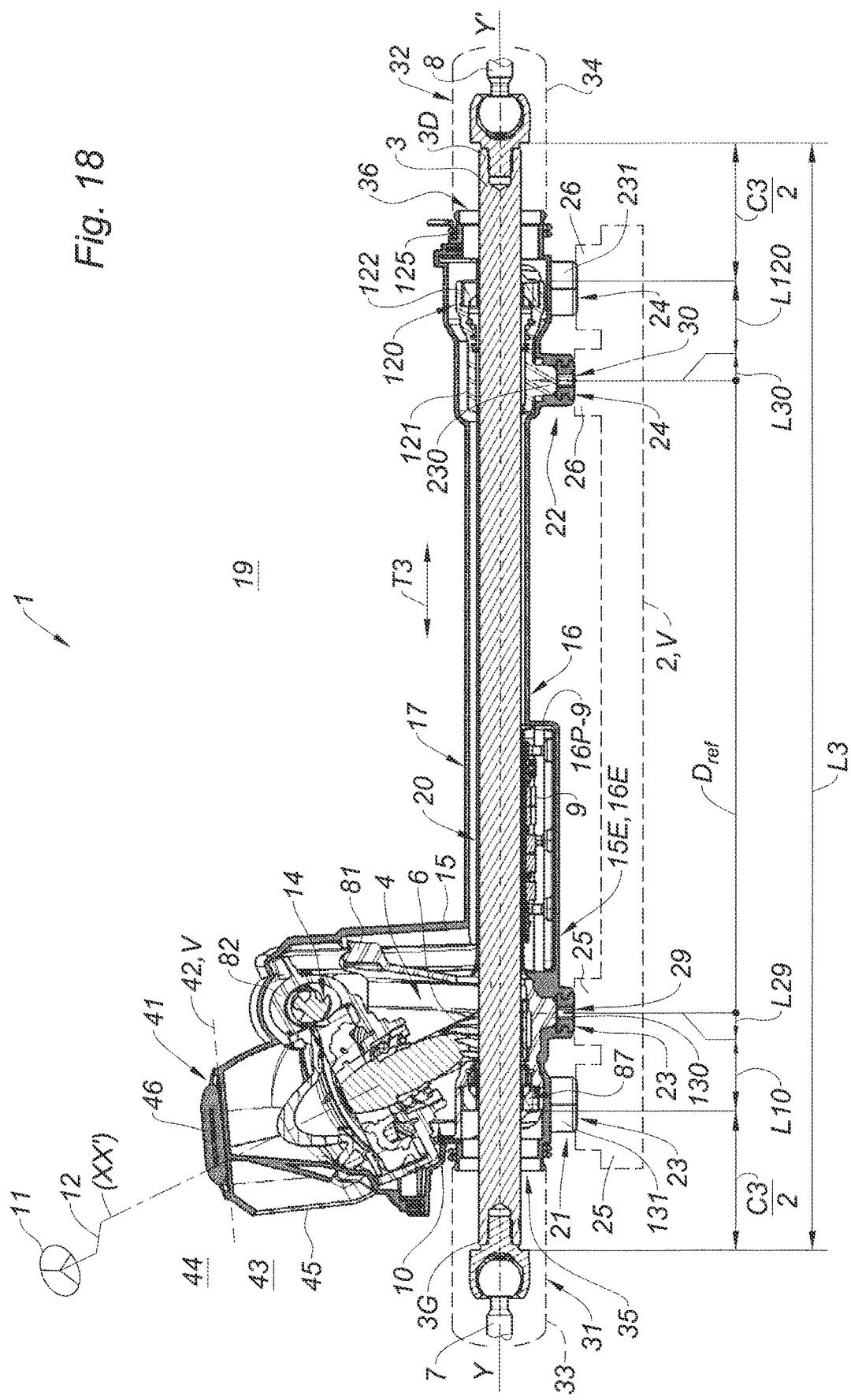
FIG. 18 illustrates, according to a longitudinal sectional view in a plane containing the longitudinal axis (YY') of the rack, the device of FIGS. 12 to 17.

The containment shell 15 according to the invention may thus include, as illustrated in particular in FIGS. 6, 12, 17 and 18:

one or several stowage interface(s) 21, 22, at which is operated the fastening of the steering device 1, and more particularly the fastening of the shell 15 and/or of the actuator subassembly 4, on the receiving structure (cradle) 2 provided to this end within the vehicle V. At these stowage interfaces 21, 22, the containment shell 15, and more particularly the base 16, will have, on its outer face 15E, respectively 16E (opposite to the enclosure 20), preferably substantially planar seat surfaces 23, 24 shaped so as to bear, where appropriate via setting wedges 27 (as detailed in FIG. 17), against anchorage points 25, 26, such as studs or bosses, belonging to the receiving structure 2. For example, the corresponding auxiliary sealing elements may comprise a preferably metallic insert 28 which is embedded in the thickness of the shell 15 (in this instance in the thickness of the base 16) and delimits through the shell 15 (through the base 16) an access orifice 29, 30 to enable the passage of a retaining element 70, such as a screw, a dowel (as represented in FIG. 17), a tie member, etc. which ensures the fastening, herein the clamping, of the device 1 against the receiving structure 2. The auxiliary sealing elements of this stowage interface may also comprise, where appropriate, the aforementioned setting wedge 27, as well as the walls of the anchorage point 25, 26 which, in cooperation with the retaining element 70 (screw, dowel or tie member), allow masking the access orifice 29, 30 formed in the shell 15 once the steering device 1 is installed on the receiving structure 2.

maneuvering interfaces 31, 32, herein a left maneuvering interface 31 and a right maneuvering interface 32, at which the steering tie rods 7, 8 emerge out of the containment shell 15 to engage the stub axles, so as to be able to transmit the translational movements T3 of the rack 3 to said stub axles in order to modify the orientation of the wheels. Preferably, the sealing will be ensured, at the maneuvering interfaces 31, 32, by auxiliary sealing elements such as bellows 33, 34, each bellow 33, 34 joining an end (a longitudinal end, considered according to the longitudinal axis (YY')) of the rigid portion of the shell 15 to a portion of the corresponding steering tie rod 7, 8, as illustrated in particular in FIGS. 6 and 18, in order to cover the corresponding end 3G, 3L of the rack 3, and therefore in order to mask the access orifices 35, 36 which enable said rack 3 to emerge out of the rigid portion of the shell 15 formed in particular by the base 16 and the bell-housing 17. Each bellow 33, 34 is advantageously elastically deformable, and in particular flexible and expandable (according to the longitudinal axis (YY')), so as to be able to accompany all the movements of the tie rod 7, 8 that said bellow clasps.

a control interface 41, by which the shell 15, and more preferably the bell-housing 17, bears against the bulkhead 42 of the vehicle, that is to say against the partition wall which separates the front compartment (engine compartment 43) of the vehicle V from the passenger compartment 44 of said vehicle (passenger compartment which accommodates the driver and/or the passengers), as schematically illustrated in FIGS. 12 and 18. At this control interface 41, the input shaft 13 emerges out of the shell 15, via an access orifice 48, to be connected to the steering column 12, and therefore integrate said steering column 12 by being thereby rotatably secured to the steering wheel 11. It should be noted that, preferably, the shell 15, and more particularly the bell-housing 17, has, integrally with the portion of the shell 15 which covers the carrier structure 10, respectively integrally with the portion of said bell-housing 17 which covers the carrier structure 10, a coupling portion 45 to the bulkhead 42 which is arranged to bear against the bulkhead 42 of the vehicle. Said coupling portion 45 somehow forms a chimney (or turret) which extends away from the rack 3, along and about the guiding axis (XX') of the input shaft 13, to join the bulkhead 42. Advantageously, such an integral formation allows in particular a simple manufacture by molding, and confers to the shell 15, and more particularly to the bell-housing 17, a stable and robust structure easy to assemble and guaranteeing a good sealing. The sealing of the maneuvering interface 41 may be achieved by a seal-type auxiliary sealing member 46, preferably made of elastomer, foam or an elastomer/foam combination, said seal may be in the form of a flat layer, possibly provided with a peripheral bulb 47, and said seal being interposed and compressed between the rigid portion of the shell 15 (herein the chimney 45) and the bulkhead 42.

a breathing interface 51, shown in particular in FIGS. 6 and 13, at which the shell 15 is provided with a «breathing» element 52, that is to say made of an air-permeable but hydrophobic material, such as a GoreTex® pellet, so as to enable air (but not water) to circulate between the enclosure 20 and the outside of the enclosure, in order to ensure a pressure balance between the pressure prevailing in the enclosure 20 and the pressure prevailing outside of the shell 15. Preferably, the breathing element 52 will thus create a porous-type access orifice 53, ensuring a selective vent-type communication, between the enclosure 20 and the passenger compartment 44 of the vehicle. In a particularly preferred manner, the breathing interface 51 is located at the same level as the control interface 41, so that these two interfaces 41, 51 are common and share the same auxiliary sealing element 46, 47 (herein a peripheral bulb seal 47), that is to say the breathing element 52 (and therefore the porous access orifice 53) is contained in the same «airlock» 41 as the access orifice 48 of the input shaft 13, and benefits of the protection of the same auxiliary sealing element 46, 47.

an electrical connection interface 61, including for example one or several sealed pin connector(s), allowing to connect the calculator 9 to the electric power supply of the vehicle (battery) as well as to the onboard network (Controller Area Network), and/or allowing to connect the assist motor 5 to the battery.

possibly a draining interface (not represented), intended to discharge out of the enclosure 20 a possible condensate derived from water vapor or even from liquid water which still would have succeeded to accidentally penetrate in said enclosure 20. To this end, the lower point of the shell 15 may be provided with an automatic drain valve forming a check-valve enabling the liquid water to be discharged out of the enclosure 20 but not to penetrate therein.

Thus, according to a preferred feature, the invention may relate as such to a power steering device 1 which comprises an actuator subassembly 4 (as defined hereinabove), as well as a containment shell 15, which is distinct from said actuator subassembly 4 and which is formed by the combination of at least one first shell portion, called «base» 16, and of at least one second shell portion, called «bell-housing» 17, which are attached and fastened to each other by a sealed junction 18 so as to delimit an enclosure 20 in which is housed said actuator subassembly 4, said containment shell 15 being provided with access orifices 29, 30, 35, 36, 48, 53 enabling access, from the outside 19 of the shell, to the enclosure 20 located inside said shell 15, and said containment shell 15 being arranged so that all the access orifices (that is to say more generally all the accesses to the enclosure 20, and more particularly all the accesses to the actuator subassembly 4 which may subsist through the base 16 and the bell-housing 17) are protected by functional interfaces 21, 22, 31, 32, 41, 51, 61 which ensure, once the device 1 is set up and fastened on the vehicle V, the sealing of the shell 15 at least against the intrusion of liquid water and salt spray in the enclosure 20, and also preferably against the intrusion of dust or any other solid foreign body (dust, filings, salt) and/or liquid (such as: water, engine oil, fuel, brake liquid, cooling liquid, windshield washer liquid, etc.) in said enclosure 20.

Among these functional interfaces, there may be found at least either or both of the functional interfaces 21, 22, 31, 32, 41, 51, 61 described in the foregoing, or any combination of said interfaces, said combination comprising for example at least one or more stowage interface(s) 21, 22, one or two maneuvering interface(s) 31, 32, and one control interface 41.

Thus, according to the invention, all the windows cut out in the shell 15, and more particularly all the windows formed in the subassembly formed by the base 16 and the bell-housing 17 to form therein access orifices 29, 30, 35, 36, 48, 53, will be fitted with auxiliary sealing elements 27, 28, 33, 34, 46, 47 in charge of ensuring the sealing of the shell 15, at the functional interfaces, in particular in order to avoid any direct exposure to water, to salt spray and to dust of the members of the device 1 sheltered in the enclosure 20, such as the actuator subassembly 4.

Preferably, the bell-housing 17, or the base 16, and in a particularly preferred manner both the bell-housing 17 and the base 16, is/are made of a plastic material, that is to say of a polymer material, and more preferably of a thermoplastic polymer allowing a manufacture by injection molding.

According to a variant called «mixed shell» variant, it can be considered to use a base 16 made of metal (for example of aluminum or magnesium alloy) on which a bell-housing 17 made of polymer is fastened.

Nonetheless, it will be preferred to use a base 16 made of polymer and a bell-housing 17 made of polymer.

Preferably, the polymer material used accordingly may be fiber-reinforced, for example with glass, carbon or aramid fibers, or any mixture of fibers containing at least two of these categories of fibers.

The polymer material(s) used to form the bell-housing 17 and/or respectively the base 16 will be chosen so as to be rigid or semi-rigid, that is to say so as to typically have a Young's modulus greater than 3 GPa, at least over the predictable range of operating temperatures of the steering device 1, that is to say at least over the range from −40° C. to +125° C.

As a non-limiting indication, it is possible in particular to use as polymer materials, in order to form the bell-housing 17 and/or the base 16: a Polyamide (PA), an aromatic Polyamide (PPA), a Polybutylene Terephthalate (PBT), a Polyethylene Terephthalate (PET), a Polypropylene (PP), or a Polyketone (PK).

Advantageously, the use of shell portions 15, and more particularly of a bell-housing 17 and/or a base 16, made of polymer confers to the containment shell 15 a great lightness, an excellent sealing, and an excellent corrosion resistance (and even an insensitivity to corrosion).

Furthermore, it is thus possible to manufacture the bell-housing 17 and the base 16 easily and at a lower cost by molding.

Therefore, according to a feature which may constitute an invention on its own, making a (rigid) shell portion of polymer material advantageously allows performing an identification marking directly on the apparent surface of the shell 15, and more particularly directly on the apparent surface of the bell-housing 17 or of the base 16, on the material, and even in the polymer material constituting said shell 15, respectively on or in the material constituting said bell-housing 17, or said base 16.

Thus, it is possible to print or engrave on the shell 15 an identification marking comprising for example alphanumerical characters, legible with the naked eye and/or by means of an optical recognition apparatus, or a standardized graphic code, such as a barcode or DataMatrix® readable by an appropriate optical reading (artificial) apparatus, such as a scanner.

The identification marking may be performed by any suitable method, such as stamping with a punch (where appropriate hot stamping), sand blasting through a stencil, laser etching, micro-percussion, etc.

Advantageously, it is thus possible to definitively associate a durable and indelible identification marking to the containment shell 15, and therefore more generally to the steering device 1.

Thanks to the invention, it will be no longer necessary to use, for identifying the steering device 1, a self-adhesive label, which would be adhered to the shell 15, but which would present the risk of being deteriorated or detached over time.

Moreover, it should be noted that the known etching or marking methods advantageously allow, by a simple surface alteration of the polymer material (and in particular by a relief mechanical alteration, by abrasion, or by thermal alteration), modifying locally the texture and the appearance of the polymer constituting the shell 15, and thus obtaining a high (light-dark) contrast between the marked areas and the blank areas, which durably guarantees an excellent readability of said marking.

Herein again, the marking method according to the invention allows obtaining a durably readable identification marking, without being necessary to resort to a label using a specific colored background to legibly highlight characters or a code on said colored background.

Moreover, according to another preferred feature which may also constitute an invention on its own, the containment shell 15, and more particularly the bell-housing 17 and/or the base 16 may be dyed (preferably mass-dyed) so as to enable the immediate visual identification of the model of the shell 15, or more preferably the model of the steering device 1 associated to said shell 15, according to a predetermined color code.

In this respect, it should be noted that the use of polymer materials will allow mass-dying easily the bell-housing 17 and/or the base 16, where appropriate by the addition of an appropriate colorant during the preparation of the polymer material.

Advantageously, the invention will thus allow visually differentiating, thanks to a predefined color code, the containment shell 15, and therefore the steering device 1, according to the used steering mechanism and/or according to the model of the vehicle to which the device 1 is intended.

As example, it is possible for example to associate to a given shell format, that is to say to bell-housings 17 with an identical format, respectively to bases 16 with an identical format, different types of steering mechanisms, for example integrating more or less powerful assist motors 5 depending on the vehicle to equip, and assigning different colors to the shells 15, that is to say to the bell-housings 17, respectively to the bases 16, depending on the type of mechanism they should receive.

Advantageously, it is thus possible to identify the steering mechanism contained in the shell 15, even after the shell 15 has been sealed around said steering mechanism and said mechanism (and in particular its motor 5) is therefore no longer visible.

According to another implementation, it is also possible to differentiate, by means of several different colors, shells 15 (and more specifically bell-housings 17, respectively bases 16) with different formats, and in particular shells 15 intended to be fastened on receiving structures 2 with distinct configurations (for example belonging to distinct vehicle models). Where appropriate, when the same type of steering mechanism may be adapted on several distinct vehicle models, it may thus be possible to immediately distinguish, thanks to the color of the shell, the vehicle model to which the steering device 1 is intended.

In any case, thanks to the visual foolproof provided by the color code, the supply and assembly operations of the steering device 1 are considerably simplified.

According to a particularly preferred variant, it is possible to associate the color of the bell-housing 17 to a first parameter characteristic of the steering mechanism contained in the shell 15, said first parameter may be for example the model of the mechanism or its power (and in particular the power of the assist motor), that is to say the color of the bell-housing 17 will be representative of the steering mechanism set up in the shell 15, whereas the color of the base 16 will be associated to a second parameter characteristic of the vehicle, and more particularly of the receiving structure 2 on which the steering device 1 should be mounted (for example the vehicle model, the configuration of the seat surfaces 23, 24 of the shell 15, etc.), such that the color of the base 16 will be representative of the target vehicle to which the steering device 1 is intended.

Of course, it is conversely possible to intrinsically characterize the steering mechanism by the color of the base 16, and the target vehicle by the color of the bell-housing 17.

Thus, the color combination of the containment shell 15, that is to say the combination of the respective colors of the bell-housing 17 and of the base 16, will visually and directly inform, according to a pre-established bicolor coding, both on the nature of the steering mechanism and on the vehicle model to which the steering device 1 is intended, which will allow making, without error and in a particularly rapid manner, in the manufacturing lines, a selection of the appropriate steering device 1 at the time of supply as well as during the mounting of said steering device 1 within the vehicle V.

Preferably, as shown in particular in FIGS. 6, 12 to 15, 20 and 22, the actuator subassembly 4 comprises an input shaft 13 which is intended to be coupled to a steering column 12 carrying a steering wheel 11, said input shaft 13 extending (longitudinally) according to a guiding, herein rectilinear, axis (XX').

The parting plane P0 of the containment shell 15, according to which the bell-housing 17 conforms to the base 16, is then preferably secant to said guiding axis (XX').

In other words, the parting plane P0 at which lies the sealed junction 18 between the respective edges of the bell-housing 17 and of the base 16 is not parallel to the guiding axis (XX') of the input shaft 13, and in particular does not contain said guiding axis (XX').

According to the shape of the course of the sealed junction 18, the parting plane P0 may in particular correspond, where appropriate, to the «average» parting plane which matches the closest, for example considering a linear regression criterion, to the course of the sealed junction 18, and even which contains said course if said course is inscribable in a plane.

In practice, the parting plane P0 is preferably substantially horizontal, and arranged so that it forms the vertically upper limit of the base 16, that is to say the base 16 is mostly, and preferably substantially entirely, located under said parting plane P0, whereas it forms the lower limit of the bell-housing 17, so that said bell-housing 17 is mostly, and preferably substantially entirely, located above said parting plane P0.

The parting plane P0, and more specifically the limit between the bell-housing 17 and the base 16, is preferably substantially parallel to the longitudinal axis (YY') of the rack, so that the shell 15 is thus, somehow, split (into a bell-housing 17 and a base 16) substantially according to said longitudinal axis (YY').

As an indication, the guiding axis (XX') may form with respect to the average parting plane P0 a (minimum) inclination angle comprised between 30 degrees, or even 45 degrees, and 90 degrees (case of an axis normal to the parting plane P0).

In any case, such an arrangement of the guiding axis (XX'), transverse to the parting plane P0, advantageously allows making said guiding axis (XX') substantially coincide with the direction, called «nesting direction» according to which the bell-housing 17 is nested onto the base 16.

Such an orientation simplifies the assembly of the steering device 1, because it is possible to set up, and in this instance to stack, according to the same common approach direction DA (herein a substantially vertical downward direction in FIGS. 12, 14, 20, 22, and which substantially coincides with the nesting direction), first the actuator subassembly 4, carrying the input shaft 13, which is deposited (according to an approach movement performed according to said approach direction DA) in the open base 16, then the bell-housing 17 which is attached on the actuator subassembly 4, according to this same approach direction DA, by fitting the chimney 45 of the bell-housing 17 onto the input shaft 13 in order to make said input shaft 13 pass through the access orifice 48, so as to cap the actuator subassembly 4, as well as the base 16 located under the latter, with the bell-housing 17 which is pressed to bear against, and preferably which is nested into, said base 16 in order to form the sealed junction 18.

Furthermore, the orientation of the guiding axis (XX') with respect to the parting plane P0 allows making the bell-housing 17, and in particular the chimney 45 which borders and surrounds the access orifice 48, integrally all about the guiding axis (XX'), continuously over 360 degrees.

Thus, this avoids creating any frangible area about the guiding axis (XX'). In particular, since the sealed junction 18 is not parallel to the guiding axis (XX'), but on the contrary wraps about said guiding axis (XX'), said sealed junction 18 will not, consequently, form a crack initiation area which would be likely to promote an accidental deviation (detachment) of the bell-housing 17 from the base 16, and thus a leak.

The robustness and the sealing of the containment shell 15 are hence enhanced.

As has been said hereinabove, the actuator subassembly 4 preferably comprises an input shaft 13, intended to be coupled to a steering column 12 carrying a steering wheel 11, and which extends according to a guiding axis (XX').

Preferably, as shown in FIG. 12, the actuator subassembly 4 also comprises an output shaft 71, preferably substantially coaxial with the input shaft 13, and on which is mounted, as a drive member 6, a drive pinion intended to mesh on a toothed portion of the rack 3.

Preferably, the actuator subassembly 4 further comprises a gear reducer 14, such as a worm wheel and a worm screw reducer, which enables the assist motor 5 to engage the output shaft 71.

Preferably, the actuator subassembly 4 also comprises, as shown in particular in FIGS. 1 and 12, a driver torque sensor 72 intended to measure the torque called «driver torque» exerted by the driver on the steering wheel 11 and the steering column 12.

Preferably, said driver torque sensor 72 comprises to this end an elastically deformable torsion bar, which is interposed between the input shaft 13 and the output shaft 71 so as to be able to measure the driver torque as it is exerted between the input shaft and the output shaft.

Preferably, as detailed in particular in FIGS. 2, 7, 8 and 12, the carrier structure 10 then comprises a plurality of initially distinct casings 81, 82, 83, which are contiguous and fastened to each other according to a stack which substantially follows the guiding axis (XX').

Among these casings, there is (at least) one steering casing 81, which accommodates and guides the drive pinion 6 and the rack 3, a reducer casing 82, axially superimposed with the steering casing 81, which carries the assist motor 5 and in which is housed the gear reducer 14, then, preferably, a sensor casing 83, preferably axially superimposed with the reducer casing 82, and which accommodates the driver torque sensor 72.

Preferably, said casings 81, 82, 83 are metallic, and for example made of steel or of a light alloy, such as an aluminum alloy or a magnesium alloy.

Advantageously, a carrier structure 10 obtained by stacking of casings 81, 82, 83 allows dividing axially, along the guiding axis (XX'), said carrier structure 10 into different functional stages, each associated to a distinct casing 81, 82, 83, and therefore each assigned to a distinct function which is complementary to the functions assigned to the other stages (that is to say complementary to the function performed to, and carried out within, the other casings).

Such a modular carrier structure 10, obtained by stacking, facilitates the manufacture and the separate control of the different casings 81, 82, 83, as well as the assembly of the carrier structure 10, and more generally the assembly of the actuator subassembly 4, while allowing preserving the robustness, the rigidity and the compactness, in particular the axial compactness, of said carrier structure 10.

Of course, the casings 81, 82, 83 (each) being crossed successively by the input shaft 13 then by the output shaft 71 will comprise bearings 85, 86, such as ball bearings 85 or needle bearings 86, necessary to the rotary guidance of said input 13 and output 71 shafts within said casings 81, 82, 83, as well as, more generally, any other bearing useful to the guidance of the movable elements contained in said casings 81, 82, 83 or passing across the latter.

Thus, the steering casing 81, crossed from side to side by the rack 3, as illustrated in particular in FIG. 18, will advantageously form a first translational guide bearing, herein located in the left half of the length of the rack 3, which guides said rack 3 in translation, for example by a sliding-pivot type connection obtained by means of one or several guide(s) 87 such as plain bearings or recirculating ball screws, fastened in said steering casing 81 and receiving the rack 3. In the following, for convenience of description, it is possible to assimilate said guide(s) 87 to said first translational guide bearing.

More generally, it should be noted that said steering casing 81 will form an angle transmission support guiding both the output shaft 13 and its pinion 6 according to the guiding axis (XX'), and the rack 3 according to its axis of translation (YY') secant to said guiding axis (XX').

Figure 9:
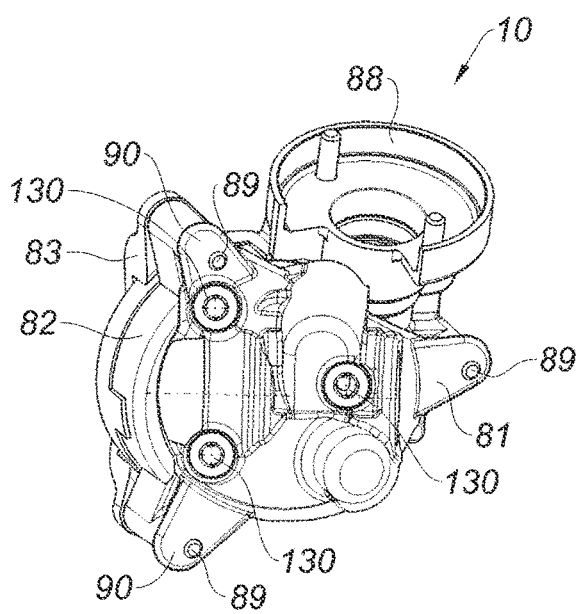
FIG. 9 represents, according to a bottom view, the carrier structure of FIG. 8 with its fastening members, herein threaded holes, enabling the fastening of said carrier structure to the receiving structure of the vehicle.

Similarly, the reducer casing 82 may comprise, on the one hand, a bearing 85 such as a ball bearing supporting the output shaft 71, and therefore the worm wheel of the reducer 14 fastened on said output shaft 71 and, on the other hand, as shown in particular in FIGS. 2 and 9, one (or more) coupling bearing(s) 88 to the assist motor 5 allowing to fasten the assist motor 5 on said reducer casing and to guide the worm screw which is driven by said assist motor and which engages the worm wheel of the reducer.

Preferably, each of the steering 81, reducer 82, and torque sensor 83 casings will be formed integrally.

Furthermore, said steering 81, reducer 82 and, where appropriate, torque sensor 83 casings will be preferably contiguous directly to each other within the stack, without axially interposing any spacer or intermediate casing therebetween.

The manufacture and the assembly of the carrier structure 10 will be thus simplified.

Moreover, it should be noted that the principle of a carrier structure 10 obtained by stacking casings 81, 82, 83 may, where appropriate, apply to a «double-pinion» mechanism, such as that illustrated in FIG. 27, or to a ball screw drive mechanism.

According to such a double-pinion variant (FIG. 27), it is possible to firstly provide a «motorized» actuator subassembly 4, comprising, stacked on each other, a reducer casing 82 carrying the assist motor 5 and the reducer 14, and a first steering casing 81 guiding the rack 3 as well as the drive pinion 6 driven by the reducer 14.

For convenience of notation, it can be considered that, in a general manner, and regardless of the type of implemented mechanism (single-pinion or double-pinion), the expression «actuator subassembly» 4 refers to a motorized actuator subassembly, that is to say embedding the assist motor 5.

The motorized actuator subassembly 4 will be advantageously housed in the shell 15, inside the enclosure 20.

According to this same double-pinion variant, it is possible to provide afterwards a «manual» actuator subassembly 204, which may or may not also be housed in the containment shell 15 (in the same enclosure 20 as the motorized actuator subassembly 4), said manual actuator subassembly 204 comprising at least one second steering casing 221 which, on the one hand, guides the steering column 12 on which the steering wheel 11 is fastened, and which, on the other hand, also guides the rack 3 on which said steering column 12 meshes by means of the auxiliary pinion 206.

The manual actuator subassembly 204 is preferably, and conversely to the motorized actuator subassembly 4, devoid of any assist motor 5 capable of acting on the rack 3, so as to simply enable the mechanical transmission of the manual force exerted by the driver on the steering wheel 11 to the rack 3, via the steering column 12.

Preferably, the manual actuator subassembly 204 will comprise, stacked on each other, on the one hand, said second steering casing 221 which guides the steering column 12 (and more particularly the auxiliary pinion 206) and the rack 3 and, on the other hand, a torque sensor casing 83.

According to a first sub-variant of this double-pinion variant, it is possible to choose to protect, by a shell 15 according to the invention, only the motorized actuator subassembly 4, whereas the manual actuator subassembly 204 (with its second steering casing 221 and, where appropriate, with its torque sensor casing 83) will be located out of the shell 15, outside the enclosure 20, as illustrated in FIG. 27.

The manual actuator subassembly 204 may then have its own sealing means, distinct from the shell 15.

According to a second sub-variant of this double-pinion variant, the manual actuator subassembly 204 will comprise, stacked on each other, on the one hand, the second steering casing 221 which guides the steering column 12 and the rack 3 and, on the other hand, the torque sensor casing 83, and said manual actuator subassembly 204 will be (integrally) housed in the containment shell 15, in the same enclosure 20 as the motorized actuator subassembly 4.

Of course, the arrangement of a ball screw mechanism according to the invention may be deduced mutatis mutandis from the description of the double-pinion mechanism, disclosed hereinabove with reference to FIG. 27, simply by replacing the drive pinion 6, and even the drive pinion 6/reducer 14 assembly, by a ball screw engaged on the rack 3.

Moreover, although the constructive principle of a carrier structure 10 obtained by the stacking of casings is adapted in particular to a double-pinion power steering mechanism, such a constructive principle will be preferably well adapted to, and preferably implemented in, a «single-pinion» mechanism, as illustrated in FIGS. 1, 4, 12 and 18.

Indeed, the stacking, within the same carrier structure 10, of a steering casing 81, a reducer casing 82 and a torque sensor casing 83 advantageously allows combining, in a particularly compact manner inexpensive to manufacture, all the useful functions (rack guidance, force transmission from the steering column 12 to the rack 3, motorized assistance, and driver torque measurement) in a same unique actuator subassembly 4.

It should be noted that, regardless of the used steering mechanism type (and in particular whether a single-pinion mechanism, a double-pinion mechanism or a ball screw mechanism is used), all the stacked casings 81, 82, 83, and/or the corresponding ramifications of the carrier structure 10, will be preferably sheltered inside the containment shell 15, that is to say confined in the enclosure 20, such that it will not be necessary to provide for additional sealing elements within the carrier structure 10 itself in order to protect from humidity and corrosion said casings 81, 82, 83 or the members (movable parts, bearings, etc.) placed inside said casings.

Thus, preferably, and regardless of the number (equal to or greater than two) of casings 81, 82, 83 stacked and secured to each other to form the stack specific to the carrier structure 10 of the considered actuator subassembly 4, the stacking of casings 81, 82, 83 of the carrier structure 10 is made without interposing, between the different adjacent casings 81, 82, 83 which form said stack, attached sealing rings, and in particular without interposing seals made of elastomer between adjacent casings belonging to said stack.

In other words, within the stack forming the carrier structure, each junction between two adjacent casings, and more particularly the first junction between the steering casing 81 and the reducer casing 82, as well as the second junction between the reducer casing 82 and the torque sensor casing 83 (second junction which is distinct from the first junction and axially distant from said first junction, along the guiding axis (XX') of the input shaft 13), are devoid of sealing rings, and in particular of seals made of elastomer.

Hence, the adjacent casings are directly contiguous to each other, according to a metal/metal contact.

Advantageously, since the sealing function is assigned to the containment shell 15 which envelops the carrier structure 10 in its entirety, it is not necessary to create a local sealing between the casings 81, 82, 83 constituting said carrier structure 10.

Therefore, the invention allows saving seals, which reduces the manufacturing cost and simplifies the assembly of the carrier structure 10, and therefore more generally of the actuator subassembly 4 and of the steering device 1, since in particular there is no longer any risk of wrongly positioning or damaging a seal during the assembly of the casings 81, 82, 83.

Figure 7:
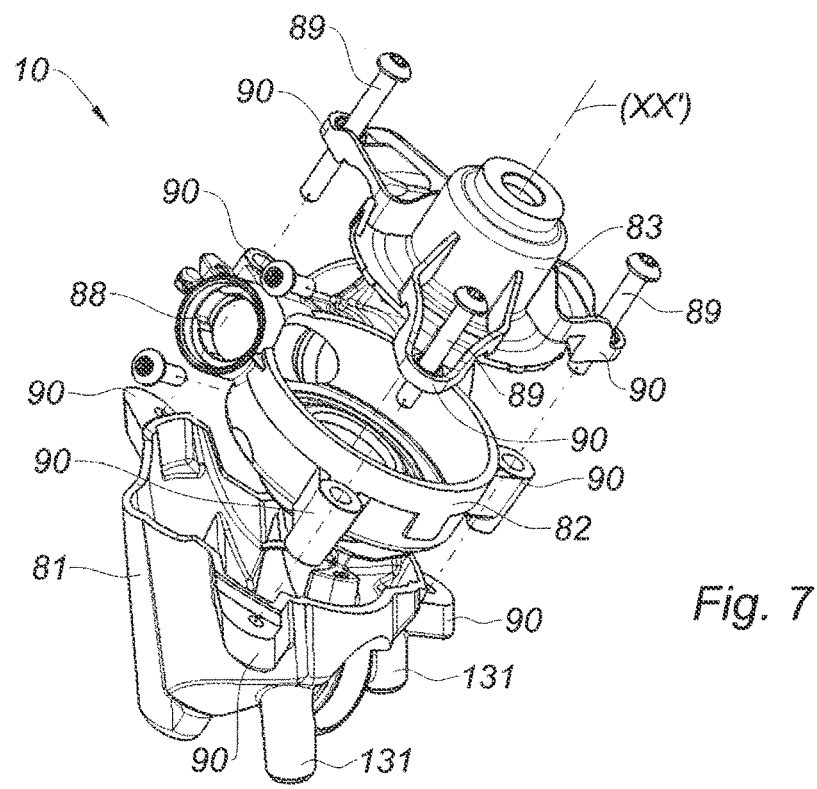
FIG. 7 illustrates, according to an exploded perspective view, the assembly of the carrier structure of FIGS. 2 and 4, in the form of a stack of casings.
Figure 8:
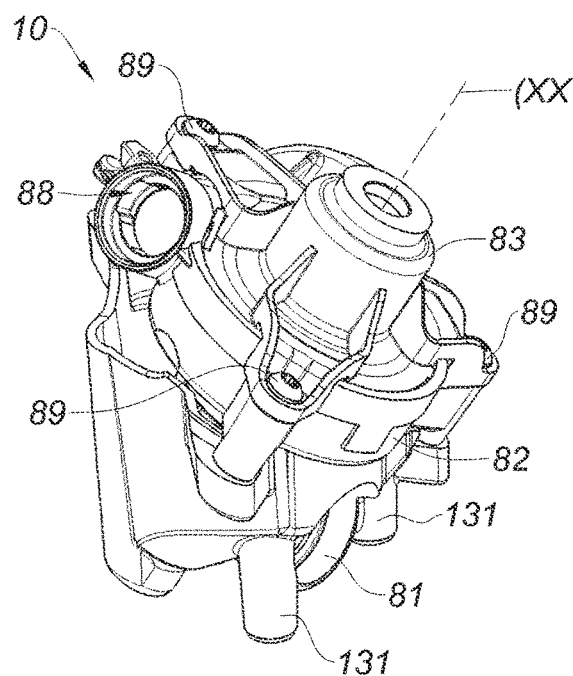
FIG. 8 illustrates, according to a perspective view, the stack of casings forming the carrier structure of FIGS. 2 and 7, in the assembled configuration.

Preferably, as illustrated in FIGS. 2, 7 and 8, the steering casing 81, the reducer casing 82 and the torque sensor casing 83 are held together by means of at least one assembly screw 89, and preferably of a plurality of assembly screws 89 (herein three assembly screws), said assembly screw, or each of said assembly screws 89, being common to the three stacked casings 81, 82, 83, and acting as a tie member which pulls the torque sensor casing 83 and the steering casing 81 mutually toward each other, thus clamping the reducer casing 82, which herein forms an intermediate casing, between said sensor casing 83 and said steering casing 81.

Preferably, the threaded endpiece of the assembly screw 89 is anchored in a thread of the steering casing 81, which steering casing 81 forms a first axial, herein lower, end of the stack, and therefore of the carrier structure 10, whereas the head of the assembly screw 89 bears against the torque sensor casing 83 which forms a second axial, herein upper, end of the stack, and therefore of the carrier structure 10.

Preferably, as shown in FIG. 7, the casings 81, 82, 83 will have legs 90 disposed substantially in a star about the guiding axis (XX'), at the periphery of said casings 81, 82, 83, and which will enable the passage and the anchorage of the assembly screws 89.

The legs 90 of the reducer casing 82 will preferably form barrels, each intended to be crossed by an assembly screw 89, and whose axial height will correspond, in order to enable said barrels to also fulfill the spacer function, to the height of said reducer height 82 which axially separates the steering 81 and torque sensor 83 casings.

Advantageously, the legs 90 will facilitate the positioning of the casings 81, 82, 83 during the assembly, both axially along the guiding axis (XX') and angularly about said guiding axis (XX').

More generally, the proposed assembly, by assembly screws 89, will be advantageously inexpensive, solid and stable.

Possible arrangements of the sealed junction 18 ensuring the sealed fastening of the bell-housing 17 on the base 16, which arrangements may constitute inventions on their own, will now be described in more detail.

It should be noted that, in absolute terms, said sealed junction 18 may be made by any appropriate method, such as in particular by bonding or by thermo-welding.

Figure 10:
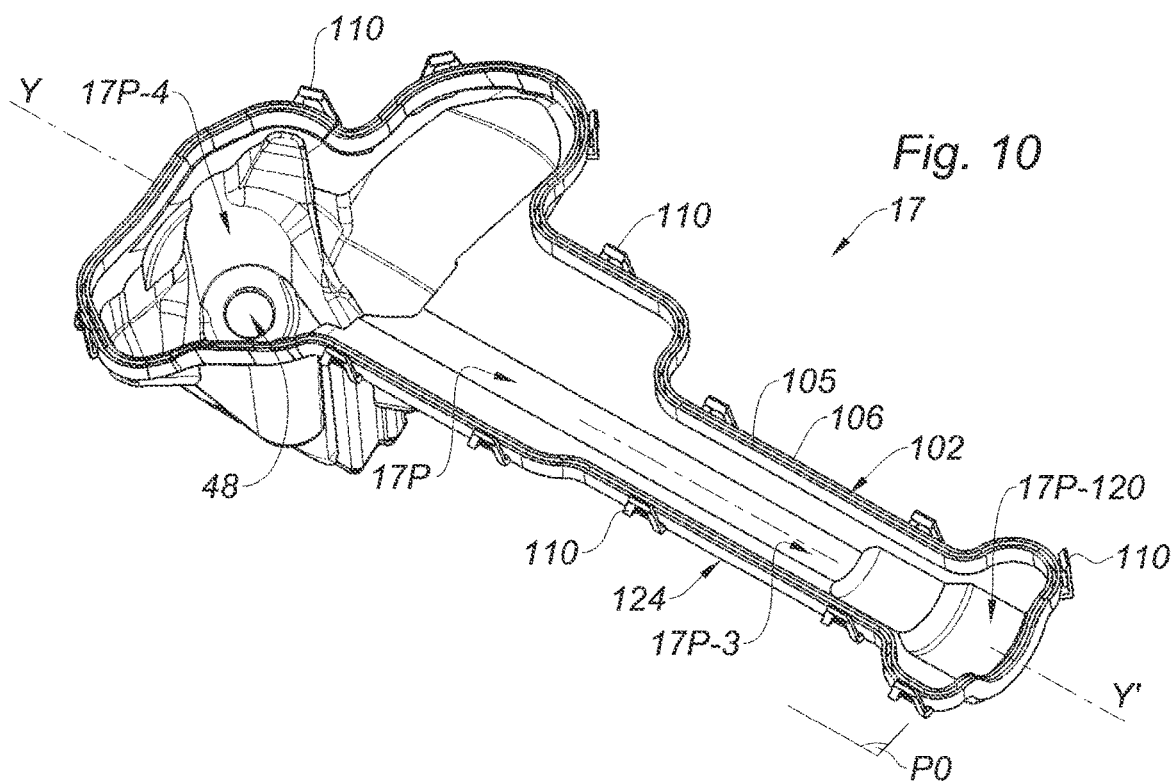
FIG. 10 illustrates, according to a perspective view, the bell-housing used to cover the carrier structure within the device of FIGS. 5 and 6, and more particularly the inner face of said bell-housing.

Preferably, as shown in particular in FIGS. 10, 12 and 16, the bell-housing 17 has a peripheral rim 102 which conforms, according to a parting plane P0 of the containment shell 15, and following the course of the sealed junction 18, to a corresponding peripheral rim 101 of the base 16 (against which bears the peripheral rim 102 of the bell-housing 17).

Preferably, said peripheral rim 102 of the bell-housing 17 is provided with at least one hooking rib 105, 106 which extends along said peripheral rim 102 of the bell-housing, according to the course of the sealed junction 18 (course which is preferably substantially parallel to the free edge of the peripheral rim 102), and which protrudes toward the base 16 with respect to the parting plane P0 (which enables said hooking rib 105, 106 to pass across the parting plane P0 in order to penetrate into the base 16 side, in the same manner as a tenon).

Preferably, the peripheral rim 101 of the base 16 is in turn provided with at least one bonding groove 103, 104 which is arranged hollowed with respect to the parting plane P0 so as to receive, on the one hand, the hooking rib 105, 106 and, on the other hand, a bonding material 107, such as a polymerizable resin, which ensures the sealed fastening, by bonding, of the hooking rib 105, 106 in the bonding groove 103, 104, so as to form by bonding a sealed junction 18 between the bell-housing 17 and the base 16, as illustrated in FIG. 16.

Thus, the bonding groove 103, 104 somehow forms a mortise (female member of the sealed junction 18) with a shape matching that of the tenon (male member of the sealed junction 18) formed by the corresponding hooking rib 105, 106 which penetrates into said bonding groove 103, 104.

Advantageously, the use of a peripheral nesting by a hooking rib 105, 106 and a bonding groove 103, 104 simplifies the centering of the bell-housing 17 on the base 16, effectively blocks the bell-housing 17 with respect to the base 16, in all the directions parallel to the parting plane (that is to say in all the lateral directions, transverse to the guiding axis (XX') or transverse to the approach direction DA), provides a very wide bonding surface (in particular according to the height common to the hooking rib 105, 106 and to the bonding groove 103, 104), which optimizes the mechanical resistance to detachment of the sealed junction 18, and finally improves the sealing by creating baffles, especially as said baffles are advantageously filled with the sealed bonding material 107.

According to a particularly preferred variant, the peripheral rim 102 of the bell-housing 17 includes, as shown in FIGS. 10 and 16, two hooking ribs 105, 106 substantially parallel to each other, which extend along said peripheral rim 102 of the bell-housing 17, a bit like rails, according to the course of the sealed junction 18, and which protrude with respect to the parting plane P0.

Preferably, the first hooking rib 105 will be internal, that is to say located on the enclosure 20 side, so that the course of said first hooking rib 105 will be contained inside the course of the second hooking rib 106, which is rather farther from the enclosure 20 and closer to the (outer) free edge of the peripheral rim 102.

The peripheral rim 101 of the base 16 is then advantageously provided, as illustrated in FIGS. 5, 6, 16, 19, 21, 23 and 25, with two bonding grooves 103, 104 substantially parallel to each other, whose respective shapes substantially match the shapes of the two hooking ribs 105, 106 of the bell-housing 17, said bonding grooves 103, 104 being arranged hollowed with respect to the parting plane P0 so that each bonding groove 103, 104 of the base 16 receives one of the two hooking ribs 105, 106 of the bell-housing 17, as well as a bonding material 107, which ensures the sealed fastening, by bonding, of each hooking rib in the bonding groove corresponding thereto, so as to form by bonding a (double) sealed junction 18 between the bell-housing 17 and the base 16.

Advantageously, the doubling of the hooking ribs 105, 106 and of the bonding grooves 103, 104 increases the extent of the bonding surfaces, and therefore improves the adhesion of the bell-housing 17 on the base 16 as well as the sealing of the sealed junction 18.

The grooved arrangement of the peripheral rim 101 of the base 16, respectively the ribbed arrangement of the peripheral rim 102, which enables the peripheral rims 101, 102 to form turned-down edges, secant and preferably substantially perpendicular (that is to say, herein, substantially vertical) to the parting plane P0, further contributes to rigidify the base 16, respectively the bell-housing 17, which facilitates the manipulation of the base 16 and of the bell-housing 17 during the assembly operations.

In a particularly preferred manner, the hooking rib(s) 105, 106, respectively the bonding groove(s) 103, 104, follow(s) each a continuous, that is uninterrupted, course all around their respective peripheral rim 102, 101, so as to form each a contour closed on itself, which extends over 360 degrees about the guiding axis (XX'), over the entire perimeter of the bell-housing 17, respectively over the entire perimeter of the base 16.

Thus, the sealed junction 18 may continuously border the parting plane P0 over the entire perimeter of the portion of the shell 15 which is formed by the combination of the bell-housing 17 and the base 16, and this including in the portions which pass through (cross) the longitudinal axis of the rack (YY').

Herein again, the centering capability, the mechanical strength of the sealed junction 18, and the sealing of the shell 15 will be improved.

For convenience of manufacture, the bonding groove(s) 103, 104, as well as the corresponding hooking rib(s) 105, 106 may advantageously have substantially U-shaped cross-sections, as illustrated in FIG. 16.

Where appropriate, it is possible to also provide for draft angles, both at the level of the bonding grooves 103, 104/hooking ribs 105, 106, as well as, more generally, in the recesses 16P, 17P of the base and of the bell-housing, in order to enable a manufacture of the bell-housing 17, respectively of the base 16, by molding from the parting plane P0.

As an indication, the (vertical) depth $H_{103}$ of the bonding grooves 103, 104, as well as the protruding height of the hooking ribs 105, 106, will be substantially comprised between 2 mm and 10 mm.

The (lateral) thickness $L_{105}$ of the hooking ribs 105, 106, as well as the (lateral) width $L_{103}$ of the bonding grooves 103, 104, may be comprised between 1.5 mm and 3 mm.

Of course, as shown in FIG. 16, a lateral clearance $J_L$, and preferably a vertical clearance $J_V$, will be provided between the faces of the hooking ribs 105, 106 and the corresponding faces of the bonding grooves 103, 104, in order to enable the bonding material 107 to seep into between said faces, in order to fill the bonding grooves 103, 104 and to wet the hooking ribs 105, 106.

As such, the lateral clearance $J_L$, that is to say the difference between the width $L_{103}$ of the bonding grooves 103, 104 and the thickness $L_{105}$ of the hooking ribs 105, 106 may be substantially comprised between 0.1 mm and 1 mm.

The vertical clearance $J_V$ offering a passage to the bonding material at the bottom of the bonding grooves 103, 104 may be also comprised between 0.5 mm and 2 mm.

Preferably, the residual volume of the bonding groove(s) which remains inside said bonding grooves 103, 104 when the hooking rib(s) 105, 106 has/have penetrated into said bonding grooves 103, 104 and is/are in place in the latter, is larger than the volume of the bonding material 107 introduced into this same bonding groove 103, 104, respectively into these same bonding grooves 103, 104, in order to make the junction between the bell-housing 17 and the base 16, so that the lateral walls which border said bonding grooves 103, 104 form anti-overflow walls 108, 109 capable of containing said bonding material 107 inside said bonding groove 103, 104, respectively said bonding grooves 103, 104, during the set-up of the bell-housing 17 on the base 16, as illustrated in FIG. 16.

Advantageously, the bonding material 107 thus remains confined in the bonding grooves 103, 104, without overflowing from said bonding grooves 103, 104, when said bonding material 107 is partially expelled by the hooking ribs 105, 106 which push it as they penetrate into said bonding grooves 103, 104.

Such an arrangement allows advantageously obtaining, in a reproducible manner, with a dosage of bonding material 107 determined once and for all, a good distribution of the bonding material, and a homogenous and clear assembly, without any run-out or attitude (inclination) defect of the bell-housing 17 with respect to the base 16.

Moreover, according to a possible variant, the peripheral rim 102 of the bell-housing 17 and/or the peripheral rim 101 of the base 16 comprises at least one, and preferably several, snap-fit tab(s) 110, designed to engage the base 16, and/or respectively the bell-housing 17, when the bell-housing 17 is closed on the base 16, so as to hold the bell-housing 17 pressed against the base 16.

The snap-fit tabs 110, elastically flexible, and which may be advantageously distributed over the entire circumference of the peripheral rim 102 of the bell-housing 17, will advantageously allow clipping the bell-housing 17 on the base 16.

Such a clipping will advantageously provide a stable mechanical holding of the bell-housing 17 on the base 16 during the polymerization of the bonding material 107, and will further enhance, complementarily to the bonding, the global resistance of the shell 15 by opposing the separation of the bell-housing 17 and of the base 16 along the parting plane P0.

Preferably, both for convenience of manufacture of the base 16 and for convenience of assembly by clipping (in particular to simplify the centering of the bell-housing 17 on the base 16), all the snap-fit tabs 110 will be carried by the bell-housing 17.

Preferably, the snap-fit tab(s) 110 are integrally formed with the bell-housing 17 (made of polymer material), and extend the peripheral rim 102 of said bell-housing 17 overhanging outwardly of the hooking ribs 105, 106, said snap-fit tabs 110 being provided, preferably substantially at their free end, with a hook 111 arranged to engage against the rim of the base, overhanging outwardly of the bonding grooves 103, 104, and more particularly overhanging outwardly of the anti-overflow walls 108, 109 of said bonding grooves 103, 104.

As illustrated in FIG. 16, the hook 111 may include a ramp 112 which forces the lateral deviation of said hook 111, by elastic flexion of the tab 110, during the depression (according to the approach direction DA) of the bell-housing 17 onto the base 16, then a stop face 113 which engages, in a no-return manner, against a shoulder 114 formed in (under) the peripheral rim 101 of the base 16, by deflection (elastic return) of the tab 110 once the hook 111 has passed through said shoulder 114.

Figure 14:
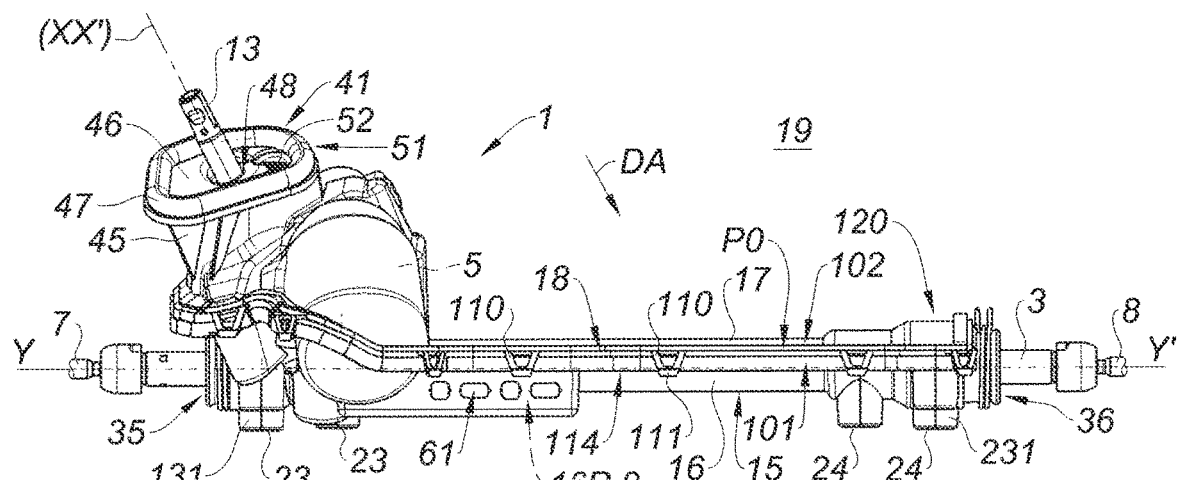
FIG. 14 illustrates, according to a front view, the steering device of FIG. 13.

The snap-fit tabs 110 may be in turn formed by recessed triangles, as shown in FIGS. 14 and 16, which thus combine good flexibility and high resistance, in particular to traction.

The outer lateral offset, which in particular enables the tab 110, derived from the bell-housing 17, to be folded over the free outer face of the anti-overflow wall 109 of the base 16, and to pass across the parting plane P0 in order to join the shoulder 114 formed in the base 16, may be obtained by a substantially L-shaped profile, as shown in FIG. 16.

Advantageously, the outer arrangement of the snap-fit tabs 110 on an apparent surface of the bell-housing 17, out of the enclosure 20 and beyond the sealed junction area between the hooking ribs 105, 106 and the bonding grooves 103, 104, allows visually checking the proper positioning and the proper snap-fitting of said tabs 110 during the set-up of the bell-housing 17 on the base 16, and therefore avoids any interference likely to damage said tabs 110 with the bonding area.

Moreover, as illustrated in particular in FIGS. 3, 4, 5, 18, 20, 22 and 26, the steering device 1 preferably comprises a planet guide bearing 120, distinct from the carrier structure 10, said planet guide bearing 120 (hereinafter «planet bearing») being disposed away from the carrier structure 10 and arranged to guide the rack 3 in translation relative to said containment shell 15.

Thus, as shown in particular in FIG. 18, the rack 3 is carried and guided in translation T3, in a stable manner, on the one hand, in its first half (considered lengthwise, along the axis (YY')), herein the left half, by a first guide 87, formed within the steering casing 81, and in its second half, herein the right half, by a second guide 122, for example a plain bearing or a recirculating ball screw, present in the planet bearing 120.

To this end, said planet bearing 120 (and more particularly the second guide 122) is placed in the alignment of the first guide 87, according to the longitudinal axis of the rack (YY'), and thus offers an additional support to the rack 3, away from the carrier structure 10, which additional support completes the action of the first guide 87 and therefore improves the accuracy and the overall quality of the translational guidance.

Preferably, the planet guide bearing 120 is, just like the carrier structure 10, disposed inside the containment shell 15, in the enclosure 20.

In this manner, although the planet bearing 120 is distinct and distant from the carrier structure 10 of the actuator subassembly 4, said planet bearing 120 is also carried by the base 16, and protected (from dust, water, salt spray and where appropriate from other foreign bodies) by the containment shell 15, with which it then shares advantageously the enclosure 20 with said actuator subassembly 4.

Structurally, just as the carrier structure 10 comprises a first steering casing 81 receiving the first guide 87 which ensures the translational guidance of the left half of the rack 3, the planet guide bearing 120 may advantageously include a second steering casing 121, preferably formed in one piece, and preferably of a metallic material (such as a steel or an aluminum or magnesium alloy), said second steering casing 121 containing the second guide 122, such as a plain bearing or a recirculating ball screw, fastened in said second steering casing 121 and ensuring the guidance of the right half of the rack 3.

The right bellow 34 may advantageously mask the access orifice 36 to said planet guide bearing 120 (and to the second guide 122).

It should be noted that, in the case of a «double-pinion» mechanism (or of a ball screw mechanism) as described hereinabove and illustrated in FIG. 27, the rack 3 is guided, on the one hand, on a first rack section, by a first steering casing 81 belonging to the motorized actuator subassembly 4 and, on the other hand, on a second rack section distinct and axially distant from the first rack section, by a second steering casing 221 which belongs to the manual actuator subassembly 204, itself distinct and distant from the motorized actuator subassembly 4.

In such a configuration, it is therefore the manual actuator subassembly 204 which will fulfill, in practice, the role of a planet guide bearing in relation to the motorized actuator subassembly 4 (and vice versa).

More particularly, it can therefore be considered that it is the motorized actuator subassembly 4 (carrying the assist motor 5) which provides the first translational guide 87, carried by the first steering casing 81 integrated to said motorized actuator subassembly 4, whereas the manual actuator subassembly 204 provides the second guide 122, carried by the second steering casing 221 integrated to said manual actuator subassembly 204.

It should be noted that, in comparison with a single-pinion mechanism, within which the second steering casing 121 simply ensures the "passive" guidance of the rack 3, the double-pinion (or ball screw) mechanism will use an «improved» second steering casing 221, arranged to ensure not only the translational guidance of the rack 3, in the second guide 122, but also, in addition, the guidance of the steering column 12, so that said steering column, controlled by the steering wheel 11, directly engages, by its auxiliary pinion 206, the rack 3, within said manual actuator subassembly 204.

As said hereinabove, in the case of a «double-pinion» mechanism (or of a ball screw mechanism), the manual actuator subassembly 204 may be either placed inside the shell 15, in the same enclosure 20 as the motorized actuator subassembly 4 or, without departing from the scope of the invention, outside the shell 15, out of the enclosure 20. In any case, the motorized actuator subassembly 4 will be protected inside the shell 15.

According to a first possible embodiment, illustrated in particular in FIGS. 5, 6, 14, 18, the planet guide bearing 20 is, just like the actuator subassembly 4, covered for one part by the base 16 (on the bottom of the bearing 120) and for the (other) part by the bell-housing 17 (on the top of said bearing 120).

Figure 11:
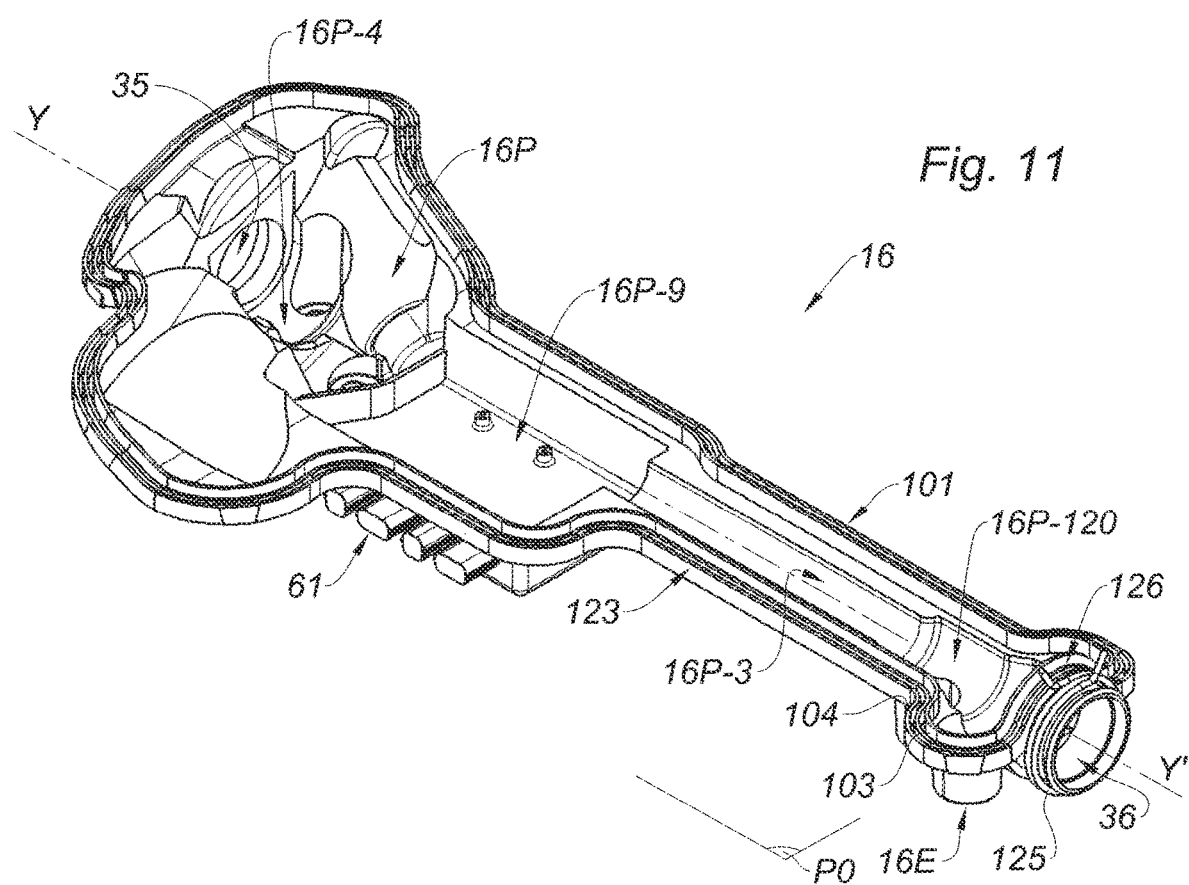
FIG. 11 illustrates, according to a perspective view, the base used to receive and cover the carrier structure within the device of FIGS. 5 and 6, and more particularly the inner face of said base.

To this end, as illustrated in FIG. 11, the hollow recess 16P of the base 16 will have a location 16P-120 open onto the parting plane P0 and specifically shaped to accommodate the planet guide bearing 120.

Said location 16P-120 will preferably have a shape substantially matching the second steering casing 121.

Similarly, as illustrated in FIG. 10, the bell-housing 17 will preferably have a hollow recess 17P provided with a location 17P-120 (complementary to the location 16P-120), open onto the parting plane P0, and intended to cover the planet guide bearing 120.

Figure 5:
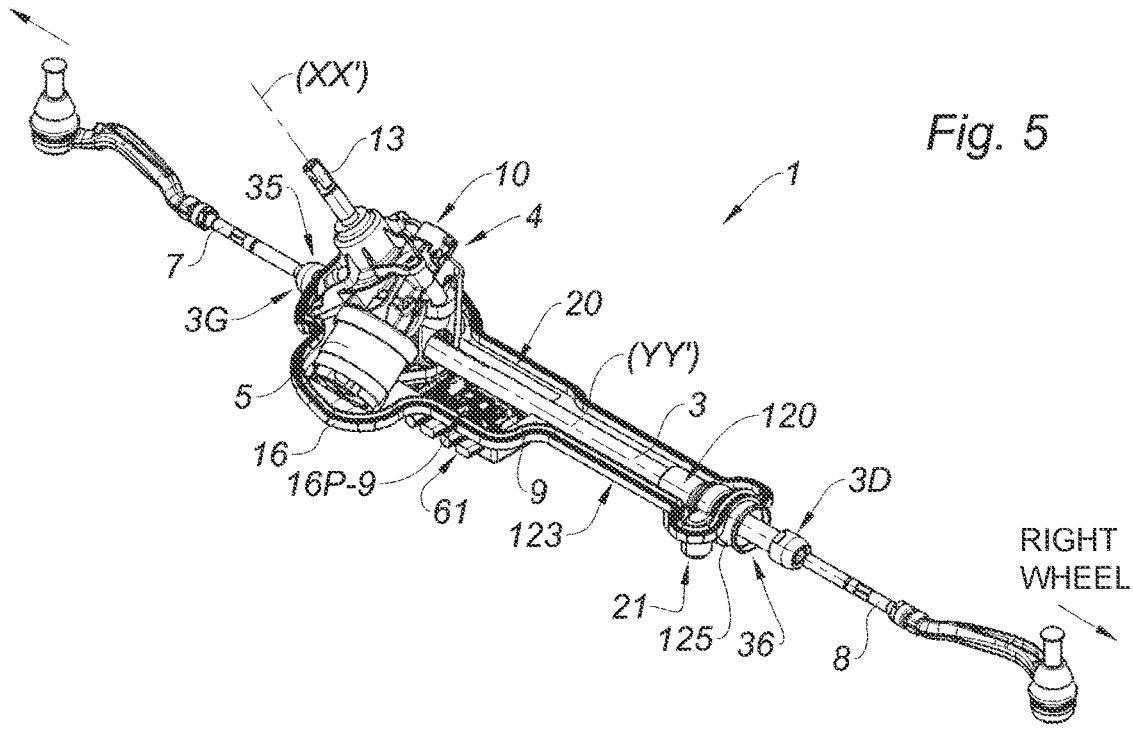
FIG. 5 illustrates, according to a perspective view, a first variant of a power steering device according to the invention, which corresponds to the set-up of the device portion of FIG. 4, and more particularly the carrier structure and the planet bearing, in a shell portion, herein a lower portion, forming a base.

Moreover, it should be noted that, preferably, according to this first possible embodiment, and as illustrated in FIGS. 5 and 11, the base 16, and more particularly its recess 16P, may have a portion forming a gutter 123 which (integrally) links the actuator subassembly 4 location 16P-4 to the planet guide bearing 120 location 16P-120, and which delimits a rack 3 location 16P-3, open onto the parting plane P0 (and which is therefore accessible by the parting plane P0 as long as the base 16 is not covered by the bell-housing 17), and intended to receive, cover, protect, and enable the passage of the rack 3 portion (in this instance the bare rack portion, that is to say not covered by a steering casing 81, 121) which is comprised between the actuator subassembly 4 (the output of the actuator subassembly 4) and the planet guide bearing 120.

Within the base 16, the rack 3 location 16P-3 will preferably have a semi-cylindrical shape, preferably with a semi-circular section, and axed on the longitudinal axis (YY').

Similarly, the bell-housing 17, and more particularly its recess 17P, which will include a location 17P-4 intended to cover the actuator subassembly 4, may have a portion forming a gutter 124 which (integrally) links the location 17P-4 intended to cover the actuator subassembly 4 to the location 17P-120 intended to cover the planet guide bearing 120, and which delimits a location 17P-3 for the rack 3, open onto the parting plane P0, and intended to receive, cover, protect, and enable the passage of the bare rack 3 portion (that is to say not covered by a steering casing 81, 121) which is comprised between the actuator subassembly 4 (the output of the actuator subassembly 4) and the planet guide bearing 120.

Herein again, within the bell-housing 17, the rack 3 location 17P-3 will preferably have a semi-cylindrical shape, preferably with a semi-circular section, and axed on the longitudinal axis (YY').

Moreover, it should be noted that, as illustrated in FIG. 11, the longitudinal end of the base 16, which delimits (to the right) the (right) access orifice 36 to the planet guide bearing 120, may form, integrally with the base 16, a terminal ring 125, with a closed annular contour centered on the longitudinal axis (YY').

Besides improving the rigidity of the base 16, such a terminal ring 125, intended to be crossed by the rack 3, forms a bridge 126 which crosses and steps over the longitudinal axis 3, above the rack 3, and thus enables a continuity of the sealed junction 18, and more particularly a continuity of the coupling by hooking ribs 105, 106 and bonding grooves 103, 104 as described hereinabove.

It should also be noted that, according to the first possible embodiment, illustrated in particular in FIGS. 5, 6, 10, 11, 14, 18, each of the base 16 and of the bell-housing 17 preferably covers, integrally, along the longitudinal axis (YY'), and each at a different side of the parting plane P0 which is substantially parallel to said longitudinal axis (YY'), at least 50% of the length L3 of the rack 3 (L3 representing the total length of the rack, considered from the left end 3G to the right end 3D), and preferably at least 75% and even about 80% to 90% of said length L3 of the rack 3.

According to this first possible embodiment, the bell-housing 17 further covers preferably substantially the same length portion L3 of the rack 3 as the base 16, the bell-housing 17 thus covering entirely the recess 16P of the base 16 (and vice versa, the base 16 covering entirely the recess 17P of the bell-housing).

Indeed, the invention allows easily making, in particular by injection molding, very extended shell portions (bell-housing 17 and base 16), offering an uninterrupted protection over a large length of the rack 3.

According to a second possible embodiment, common to the variants of FIGS. 19 and 20, 21 and 22, and 23 to 26, the planet guide bearing 120, and more particularly the second guide 122, is housed (fitted) into a tubular extension 127, forming a complete cylinder about the longitudinal axis (YY') and which, conversely to the arrangement of the first possible embodiment described in the previous paragraphs, is therefore not open onto the parting plane P0, including when the bell-housing 17 is not yet attached on the base 16.

Said tubular extension 127 may in particular cover at least 20%, at least 30%, and up to 50% and even 60% of the length L3 of the rack 3.

In particular, the use of such a tubular extension 127 will allow reducing the axial extent, along the longitudinal axis (YY'), of the bell-housing 17 (FIGS. 19, 20, 21, 22), and even both the axial extent of the bell-housing 17 and the axial extent of the base 16 (FIGS. 23 to 26).

Figure 15:
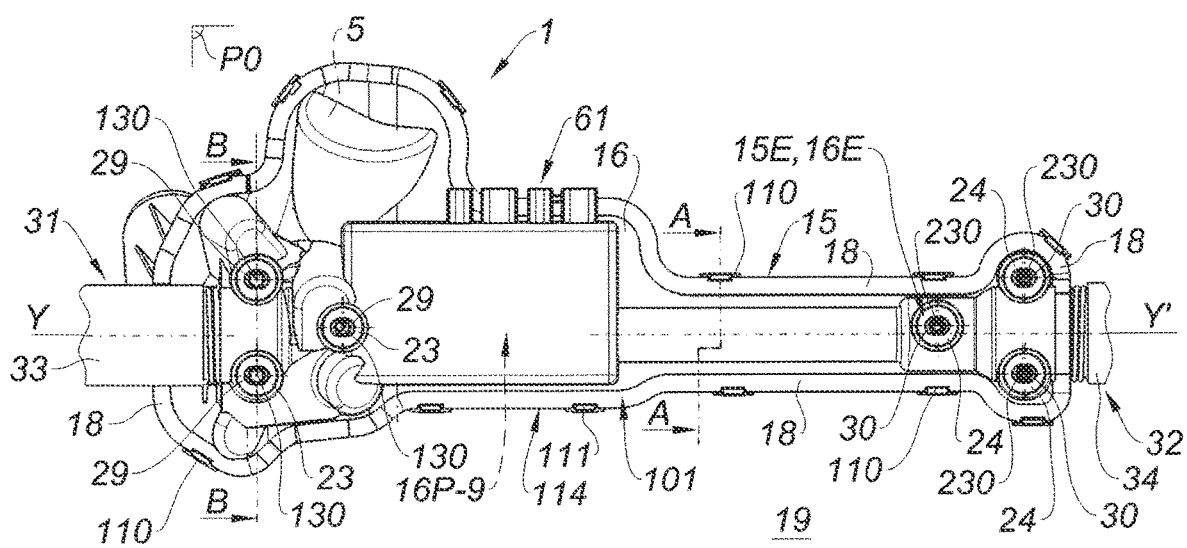
FIG. 15 illustrates, according to a bottom view, the steering device of FIGS. 13 and 14.
Figure 19:
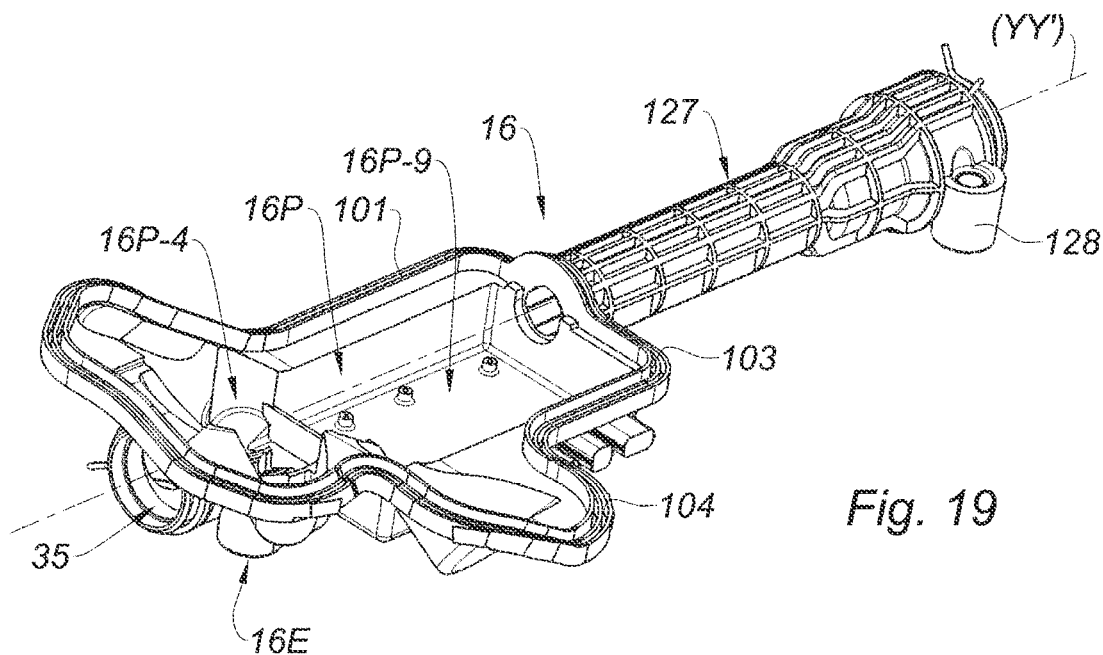
FIG. 19 illustrates, according to a perspective view, a base for a second variant of a power steering device according to the invention, in which the planet guide bearing is located in a tubular extension integrally formed with said base.

As an indication, within the second variant of FIGS. 19 and 20, the bell-housing 17 may cover between 25% and 40% and even up to 50% of the length L3 of the rack (that is to say a shorter length than within the first variant of FIGS. 13 to 15), and/or overlap and thus cover the base 16 over about 30% to 50% and even 60% of the length of said base 16, said base 16 covering in turn, as for the first variant, at least 50% of the length L3 of the rack 3, and preferably at least 75% and even about 80% to 90% of said length L3 of the rack 3.

Within the third variant of FIGS. 21 and 22, the length of the bell-housing 17, considered along the longitudinal axis (YY'), that is to say the length of the rack 3 portion covered by the bell-housing 17, may be reduced further in comparison with the length of the base 16 (that is to say in comparison with the length of the rack 3 portion covered by the base 16, including the tubular extension 127), and represent for example 20% to 30% and even 40% of the (total) length of the base 16, and/or between 15% and 35%, and preferably between 20% and about 30% of the length L3 of the rack 3.

In any case, the use of a tubular extension 127 will allow reducing the dimensions of the tooling (i.e. the mold) for manufacturing the bell-housing 17 (typically for the second, third and fourth variants), and even the dimensions of the tooling (i.e. the mold) for manufacturing the base 16 (fourth variant of FIGS. 23 to 25), and therefore the manufacturing costs of the device 1.

Furthermore, the manipulation of the bell-housing 17 and the centering of said bell-housing 17 on the base 16 will thus be facilitated.

Finally, this reduction of the size of the bell-housing 17 and/or of the base 16, will allow reducing the total length (the perimeter) of the sealed junction 18, which will simplify the nesting of the bell-housing 17 on the base 16 and will allow savings of bonding material 107.

It should be noted that the tubular extension 127 may be integrally formed with the base 16, where appropriate by molding, as it is the case within the second variant (FIGS. 19 and 20) and the third variant (FIGS. 21 and 22) of the steering device 1.

Alternatively, the tubular extension 127 may be formed by a distinct part of the bell-housing 17 and of the base 16, attached and fastened on the bell-housing 17 and/or on the base 16, as it is the case within the fourth variant illustrated in FIGS. 23 to 26.

The tubular extension 127 may in particular be formed to this end by a metallic tube section.

The tubular extension 127 may thus form a third portion of the containment shell 15 which, in association with the base 16 and the bell-housing 17, forms the rigid portion (the totality of the rigid portion) of the containment shell 15, unlike the first, second and third variants of the device 1 (FIGS. 5 to 22) within which two parts, in this instance the base 16 and the bell-housing 17, are sufficient (alone) to form the rigid portion of the containment shell 15.

According to this fourth variant illustrated in FIGS. 23 to 26, the bell-housing 17 and the base 16 may have, along the longitudinal axis (YY'), equal lengths, which may represent for example between 15% and 35%, and preferably 20% to 30% of the length L3 of the rack 3.

Whether the tubular extension 127 is integrated to the base 16 or formed by an attached distinct part, said tubular extension 127 may advantageously be provided with fastening legs 128, such as barrels, in particular in the vicinity of the second guide bearing 120, which will allow fastening the tubular extension 127 on the receiving structure 2 of the vehicle, or fastening other members of the vehicle on said tubular extension 127.

Where appropriate, and in particular when the tubular extension 127 is formed of a polymer material and/or when said tubular extension 127 is integral with the base 16, the fastening legs 128 may be advantageously formed integrally with said tubular extension 127, as illustrated in FIGS. 19 to 22.

Moreover, it should be noted that, preferably, in addition to the actuator subassembly 4, and where appropriate in addition to the actuator subassembly 4 and to the planet guide bearing 120 (or to the manual actuator subassembly 204), the containment shell 15, and more particularly the rigid portion of the shell delimited by the base 16 and the bell-housing 17, also contains, in the same enclosure 20, the calculator 9 which manages the steering device.

In other words, the containment shell 15 advantageously allows protecting at least, in a grouped manner, on the one hand, the motorized actuator subassembly 4, that is to say including the assist motor 5 and the corresponding carrier structure 10 and, on the other hand, the calculator 9 which pilots said assist motor 5 (and more generally which pilots the power steering device 1).

According to a first possible arrangement, which corresponds in particular to FIGS. 5, 6, 10, 11, 13 to 15, and 18 to 20, and therefore to the first and second variants of the device 1, the calculator 9 may be housed under the rack 3, in the interstitial space comprised between the rack 3 and the receiving structure (the cradle) 2, opposite to the input shaft 13 and to the bulkhead 42 of the vehicle with respect to the rack 3 (and with respect to the longitudinal axis (YY') of said rack).

Such an arrangement will advantageously allow placing the calculator 9 in a relatively cleared volume of the engine compartment 43, and thus gaining in compactness in the upper portion of the steering device 1, and in particular on the back of the assist motor 5, at which the available place in said engine compartment 43 is relatively restricted.

To this end, the calculator 9 will be preferably housed integrally in the base 6, in a calculator location 16P-9 marked hollowed in the recess 16P of said base 16, as in particular shown in FIG. 11.

Said calculator location 16P-9 is preferably located (and comprised) longitudinally, that is to say according to the longitudinal axis (YY'), between the actuator subassembly 4 location 16P-4 (herein located to the left of the calculator location 16P-9) on the one hand, and the rack (gutter) location 16P-3, which is herein located to the right of the calculator location 16P-9, as well as the planet guide bearing location 16P-120 (which extends the rack location 16P-3) on the other hand.

The calculator location 16P-9 will be advantageously deeper (with respect to the parting plane P0 onto which opens said calculator location 16P-9) than the rack location 16P-3, so as to be able to house the calculator under said rack 3.

Furthermore, the calculator location 16P-9 will be preferably formed integrally, for example by molding, and preferably of a polymer material, with the other locations for the actuator 16P-4, for the rack 16P-3 and for the planet guide bearing 16P-120.

According to a second possible arrangement, which is herein common to the third variant (FIGS. 21, 22) and to the fourth variant (FIGS. 23 to 26), the calculator 9 may be housed in the enclosure 20 on the back of the assist motor 5.

Such an arrangement will possibly allow simplifying the wiring of the assist motor 5 and of the calculator 9, and enable making a bell-housing 17 and a base 16 more compact (shorter) according to the longitudinal axis (YY') than the bell-housing 17 and the base 16 implemented according to the first possible arrangement with the calculator 9 housed under the rack 3.

According to this second possible arrangement, the calculator 9 may be housed in a calculator location 16P-9, 17P-9 which is shared between the base 16 and the bell-housing 17, as shown in FIGS. 21 to 26.

According to a preferred feature which may constitute an invention on its own, and as illustrated in particular in FIGS. 9, 15, 17 and 18, the carrier structure 10 is provided with fastening members 130, such as threaded (preferably blind) holes, intended to enable the fastening of the power steering device 1 on the vehicle V, through the containment shell 15.

Preferably, the containment shell 15, and more preferably the base 16, then comprises, on its outer surface 15E, 16E, and as said hereinabove with reference to the stowage interface 21, seat surfaces 23 intended to come into contact with the anchorage points 25, such as studs, belonging to the receiving structure 2 of the vehicle, said seat surfaces 23 being pierced with access orifices 29 which pass across the thickness of the containment shell 15 and open into the enclosure 20, opposite the fastening members 130 of the carrier structure 10, so as to enable the creation of a fastening link, typically by direct tensile-stress by means of a retaining element 70 such as a screw or a dowel between, on the one hand, the anchorage points 25 of the receiving structure 2 of the vehicle receiving the steering device 1 and, on the other hand, said fastening members (threaded holes) 130 belonging to the carrier structure 10 housed in the containment shell 15.

Advantageously, such an arrangement enables the retaining elements (dowels) 70 derived from the receiving structure (cradle) 2 to directly engage in the preferably metallic, carrier structure 10 which forms the rigid framework of the actuator subassembly 4, which guarantees a stable and robust stowage of said actuator subassembly 4, and therefore more generally of the device 1 to the cradle 2.

Preferably, the carrier structure 10 will have, herein on its lower face, three fastening members (threaded holes) 130, disposed in the form of a triangle, and each receiving a retaining element 70, so as to ensure a stable and solid fastening at three points.

Alternatively, a fastening member 130 may be a smooth hole intended to receive a slug, so as to enable a centering of the carrier structure, whereas the two other fastening members 130 will enable a fastening by screw clamping.

The fastening member(s) 130 may advantageously be arranged (and more particularly pierced) in feet 131 protruding under the carrier structure 10, said feet 131 being in this respect preferably integrally formed with the first steering casing 81.

The positioning height of the containment shell 15 with respect to the anchorage points 25 (studs) may be adjusted, if necessary, by one or more setting wedge(s) 27, ad illustrated in FIG. 17.

Advantageously, depending on the choice of the setting wedges 27, it is possible to freely modify the attitude of the shell 15 (that is to say the pitch and roll inclination of said shell 15), and more generally the attitude of the device 1, and therefore for example set the horizontality of said shell 15, respectively of said device 1.

Moreover, it should be noted that, advantageously, by pressing against the receiving structure 2, the containment shell 15, and more particularly the inserts 28 which are embedded in the thickness of the base 16 to form and enhance the access orifices 29 enabling the insertion of the retaining elements (dowels) 70, allows ensuring a good sealing at the stowage interface 21, by ultimately masking the access orifices 29 once the steering device 1 is in place on the receiving structure (cradle) 2.

In particular, it is thus possible to avoid the intrusion of liquid water, dust or salt spray (or other foreign, in particular liquid, bodies) in the threaded holes 130.

It should be noted that the invention advantageously allows preserving the fastening members (threaded holes) 130 in the carrier structure 10, that is to say in the confined and protected volume of the enclosure 20, and more particularly in the volume delimited by the nesting of the bell-housing 17 on the base 16 and thus contained between said bell-housing 17 and said base 16, while nevertheless enabling the creation of a fastening link, made by means of the retaining elements 70 which pass across the shell 15, between said carrier structure 10 and the receiving structure 2 which is located in the engine compartment 42 and which is therefore exposed to the environment 19, and in particular to water, to dust and to salt spray.

In order to further enhance the sealing of the stowage interface 21, but also to ensure the fastening of the carrier structure 10 to the shell 15, and more particularly the fastening of the carrier structure 10 to the base 16, it is advantageously possible to place the carrier structure 10 (and more particularly the feet 131 of the first steering casing) into contact with the insert 28 (where appropriate, after having placed each foot 131 into contact with the corresponding insert 28), so that the fastening member (the threaded hole) 130 is thus superimposed with the insert 28 opposite the access orifice 29, then to fill with a tight and corrosion-resistant, filling material 132, such as a resin, the interstice which is comprised between each foot 131 of the carrier structure and the (inner) wall of the shell 15, herein the inner wall of the base 16, at the bottom of the actuator subassembly location 16P-4, as illustrated in FIG. 17.

Thus, it is possible to seal the carrier structure 10 in the base 16 by bonding.

Also for enhancing the sealing, it is possible to provide for an O-ring seal 133, at the base of the foot 131, pinched between the foot 131 and the insert 28, preferably in a shoulder hollowed in the foot 131, which O-ring seal 133 will be also embedded in the filling material 132, as illustrated in FIG. 17.

Preferably, the system for fastening the planet guide bearing 120 (that is to say the second steering casing 121) to the containment shell 15 and to the receiving structure 2 of the vehicle will be similar to the above-described fastening system of the carrier structure 10, the features of a fastening system being deduced mutatis mutandis from those of the other fastening system.

Thus, preferably, as illustrated in FIGS. 3, 15 and 18, and similarly to FIG. 17, the planet guide bearing 120, and more particularly the second steering casing 121, is provided with fastening members 230, such as threaded holes, intended to enable the fastening of the power steering device 1 on the vehicle V, through said containment shell 15.

Preferably, the containment shell 15, and more preferably the base 16, then comprises, on its outer surface 15E, 16E, seat surfaces 24 intended to come into contact with anchorage points 26, such as studs, belonging to the receiving structure 2 of the vehicle, said seat surfaces 24 being pierced with access orifices 30 which pass across the thickness of the containment shell 15 and open, into the enclosure 20, opposite the fastening members 230 of the planet guide bearing, so as to enable the creation of a fastening link (by direct tensile-stress by means of a retaining element 70 such as a dowel) between, on the one hand, the anchorage points 26 of the receiving structure 2 of the vehicle receiving the steering device 1 and, on the other hand, said fastening members (threaded holes) 230 belonging to the planet guide bearing 120 housed in the containment shell 15.

Herein again, the second steering casing 121 may include three fastening members 230, distributed in the form of a triangle, and preferably blind threaded holes 230 pierced in feet 231 protruding under, and formed integrally with, said second steering casing 121.

The sealing (combining the mechanical fastening and the achievement of the sealing) of the second steering casing 121 in the shell 15, and more particularly in the base 16, on the insert 28, may also be carried out by bonding using a filling material 132, possibly completed by an O-ring seal 133, according to a configuration illustrated in FIG. 17 (in which it is sufficient to replace the first steering casing 81 of the carrier structure 10 by the second steering casing 121 of the planet guide bearing 120, and adapt the references of the seat surfaces 23, 24, anchorage points 25, 26, and access orifices 29, 30).

Similarly, it is possible to use setting wedges 27 in order to form spacers between the anchorage points 26 and the seat surfaces 24 of the shell 15.

Advantageously, the steering device 1 will thus have two autonomous sets of fastening members 130, 230 allowing fastening said device 1 on the receiving structure 2 in a stable and solid manner, by means of a first (main) fastening of the carrier structure 10, and of a second fastening of the planet bearing 120, independent and distant from the first fastening.

It should be noted that the seat surfaces 23, 24 may have any suitable shape, substantially matching the shape of the anchorage points 25, 26.

Preferably, in order to guarantee the stability of the device 1 as well as the capability of setting the half-stroke of the rack 3, as will be described hereinafter, the seat surfaces 23, 24 will be substantially planar, and preferably parallel to the longitudinal axis (YY'), as well as, more preferably, parallel to the parting plane P0.

According to a preferred feature which may constitute an invention on its own, applicable to the fastening of the carrier structure 10 and/or where appropriate to the fastening of the planet guide bearing 120, and as shown in FIGS. 15 and 18, the access orifices 29, 30 pierced in the containment shell 15 at the seat surfaces 23, 24 are oblong, according to the direction (YY') of translation of the rack, so as to enable, during the positioning of the carrier structure 10 (and more particularly during the positioning of the first steering casing 81) in the containment shell 15, and more particularly in the (open) base 16 and/or, where appropriate, during the positioning of the planet guide bearing 120 (and more particularly during the positioning of the second steering casing 121) in said containment shell 15, and more particularly in the (open) base 16, the setting of the spacing distance $D_{ref}$ which separates, within said containment shell 15 (within the base 16), the carrier structure 10 from the planet guide bearing 120, so as to enable the adjustment of the half-stroke C3/2 of the rack 3.

Indeed, as illustrated in FIG. 18, the oblong access orifices 29, 30, orientated substantially parallel to the longitudinal axis (YY'), offer an adjustment length L29, L30 according to which it is possible to displace and adjust the longitudinal position, along the longitudinal axis (YY'), of the carrier structure 10, respectively of the planet guide bearing 120, and more particularly the longitudinal position of the fastening members (threaded holes) 130, 230, relative to the shell 15, and more particularly relative to the base 16, before sealing (and therefore definitively immobilizing) said carrier structure 10, respectively said planet guide bearing 120, in said base 16.

Yet, the distance L10 between, on the one hand, the fastening members 130 of the carrier structure 10 and, on the other hand, the edge of the first guide 87 which forms a stop (herein a left stop) against the inward translational movement T3 according to which the left end 3G of the rack 3 tends to return toward the inside of the shell 15 and, respectively, the distance L120 between, on the one hand, the fastening members 230 of the planet bearing 120 and, on the other hand, the edge of the second guide 122 which forms a stop (herein a right stop) against the inward translational movement T3 according to which the right end 3D of the rack 3 tends to return toward the inside of the shell 15 (and therefore according to which the left end emerges out of the shell 15), is known, constant, and relatively well mastered.

By longitudinally shifting the position of the fastening members 130, 230 relative to the shell 15, the position of the longitudinal stops of the rack 3 associated to the (first, and respectively second) guides 87, 122, and which define the translational stroke C3 of said rack 13, in particular with regards to the total length L3 of the rack, is similarly shifted relative to the shell 15.

Consequently, it is possible to set, at each side (left and right), the half-stroke C3/2, that is to say the translation amount, according to which the rack can be displaced at the concerned side in order to maneuver the steered wheels.

As an indication, it should be noted that, during the manufacture of a base 16 by molding a polymer material, the typical tolerance interval on the axial distance which separates the passage orifices 29, 30 is in the order of +/−2 mm; whereas the admissible maximum tolerance on the half-stroke C3/2 of the rack 3 is in the order of +/−0.5 mm.

The longitudinal setting capability according to the invention allows therefore catching up with the dimensional defects of the shell 15 and achieving the accuracy required for the translation T3 of the rack 3.

In practice, in order to proceed to the setting, it is possible to place the base 16 (empty and open) on a jig which has stowage studs spaced accurately by a predefined axial distance which corresponds to the desired spacing distance $D_{ref}$ to obtain the targeted stroke C3.

Once the base 16 is set on the jig, we ensure that the access orifices 29, 30 pierced in the base 16 coincide substantially with said stowage studs.

Afterwards, the actuator subassembly 4 (and more particularly the first steering casing 81 of the carrier structure 10) is attached in the recess 16P of the base 16 (herein in the left portion of said recess 16P); opposite the stowage studs, and the actuator subassembly 4 is temporarily fastened to the jig, in the proper position, through the bottom of the base 16, by screwing the fastening members 130 (threaded holes) to the stowage studs of said jig.

Afterwards, the actuator subassembly 4 is sealed in position in the base 16 by casting and by polymerizing a filling material 132.

We will proceed similarly to attach, set and fasten the planet guide bearing 120, in the right portion of the base 16.

Where appropriate, it is possible to firstly mount (screw) the actuator subassembly 4 and the planet guide bearing 120 in the base 16, before proceeding to the grouped sealing of these two elements in said base 16.

The actuator subassembly 4 and the planet guide bearing 120 thus automatically adopt a spacing $D_{ref}$ which corresponds to the axial distance imposed by the jig, and advantageously and definitively preserve said spacing $D_{ref}$ once they are fastened in the base 16 by the filling material 132.

Then, it is possible to complete the assembly of the device 1, in particular by fitting the rack 3 into the first and second steering casings 81, 121, then closing the shell by attaching and sealing by bonding the bell-housing 17 on the base 16.

Then, the completed steering device 1 may be dismounted (unscrewed) from the jig and stored before being attached and mounted in a vehicle.

Of course, the invention also concerns as such a vehicle V, in particular a motor vehicle intended to passengers' transportation, which is equipped with a power steering device 1 according to either one of the variants described in the foregoing.

More particularly, the invention concerns a vehicle V comprising a cradle 2 supporting the steered wheels (and in particular, where appropriate, the suspension members of said wheels), cradle 2 on which the steering device 1 is set and fastened, by its stowage interfaces 22.

Preferably, said vehicle also comprises a bulkhead 42, separating the passenger compartment 44 from the engine compartment 43, and against which said steering device 1 also bears, by its control interface 41.

Finally, the invention concerns a method for assembling a device 1 according to either one of the variants described in the foregoing, method comprising placing the base 16 on a jig (mounting table), attaching, setting in longitudinal position and fastening in the recess 16P of said base 16 the actuator subassembly 4, as well as, where appropriate, the planet guide bearing 120, then closing the containment shell 15 by attaching, nesting and fastening (by bonding) the bell-housing 17 over the base 16, so as to form a sealed protective overwrap around the (inner) mechanical framework of the device 1, as described in the foregoing.

Securing the bell-housing 17 on the base 16 may be advantageously achieved by filling beforehand the bonding grooves 103, 104 of the base 16 with a predetermined amount of bonding material (resin-type polymer glue) 107, then by attaching the bell-housing 17 on the base, so as to make the hooking ribs 105, 106 penetrate into said bonding grooves 103, 104, and therefore in the bonding material 107, and by pursuing the depression movement according to the approach direction DA until the hooks 111 of the snap-fit tabs 110 engage against the shoulder 114, over the entire circumference of the peripheral rim 101 of the base 16. Thus, the fastening by nesting and snap-fitting will advantageously hold the bell-housing 17 in position on the base 16 for the duration necessary to the curing of the bonding material 107.

It should be noted that, advantageously, by making most of the shell 15 (with the exception of the auxiliary sealing elements which ensure the sealing at the interfaces), and more particularly by making the rigid portion of the shell 15, by means of a very limited number of parts, in this instance preferably by means of only two parts (the base 16, and the bell-housing 17), or possibly by means of three parts (if a tubular extension 127 is further attached), the assembly of the device 1 is made reliable and considerably simplified, by reducing the number of necessary operations, as well as the number of junctions to seal (in particular since the structural junctions related to the constitution and to the mechanical strength of the carrier structure 10 no longer need to be intrinsically sealed against water and salt spray, this sealing function being assigned to the sealed junction 18).

More generally, it will be appreciated that the modular arrangement of the steering device 1, which comprises, on the one hand, inner members, capable of ensuring, as such, the maneuver (and in particular the motorized maneuver) of the rack, said inner members comprising at least one first module formed by the (motorized) actuator subassembly 4 and, preferably, a second module distinct from the first module and formed by the planet guide bearing 120 (or where appropriate by 7*a* second manual actuator subassembly), said inner members may also comprise the rack 3 in its entirety, as well as, where appropriate, the calculator 9 and, on the other hand, a containment shell 15, distinct from said inner members and formed by outer members (bell-housing 17, base 16, tubular extension 127, and auxiliary sealing elements), which separates the inner members of the external environment 19 of the device 1, by forming an outer envelope which surrounds and protects said inner members, so as to contain said inner members in an enclosure 20 sealed against water, dust, salt spray, and other foreign, in particular liquid, bodies.

In this respect, it should be noted in particular that the actuator subassembly 4, and where appropriate the planet guide bearing 120, that is to say the aforementioned first module and second module, are preferably entirely contained inside the overall volume delimited by the rigid portion of the shell 5, and more particularly inside the volume delimited by the sole combination of the bell-housing 17 and of the base 16 (without surpassing said volume), and therefore inside the perimeter of the sealed junction 18, such that they are protected against mechanical attacks (impacts, gravel projection, etc.) as well as chemical attacks (water, salt spray☐).

Of course, the invention is in no way limited to the sole variants described in the foregoing, those skilled in the art being in particular capable of freely isolating or combining together either of the aforementioned features, or substituting them with equivalents.

The invention claimed is:

1. A power steering device intended to be installed on a receiving structure belonging to a vehicle, said device comprising:
   a steering rack;
   at least one subassembly, which is intended to maneuver said rack and which includes
      at least one assist motor,
      a drive member, arranged to be driven by the assist motor and to engage the rack in order to be able to drive the rack in displacement, and
      a carrier structure which carries the assist motor and which is arranged to support and guide the drive member and the rack relative to each other; and
   a containment shell, which is distinct from the at least one subassembly, and which is formed by the combination of at least one first shell portion and a second shell portion, which are attached and fastened to each other by a sealed junction so as to surround the at least one subassembly with a protective envelope which isolates said at least one subassembly from the external environment of the steering device, so that said containment shell prevents said at least one subassembly from being exposed to water projections and to salt spray, when the power steering device is in place on the receiving structure of the vehicle,
   wherein the first shell portion and the second shell portion each surround a portion of the at least one assist motor and the drive member.

2. The steering device according to claim 1, wherein the at least one subassembly comprises an input shaft, intended to be coupled to a steering column carrying a steering wheel and which extends according to a guiding axis an output shaft on which is mounted, as the drive member, a drive pinion intended to mesh on a toothed portion of the rack a gear reducer which enables the assist motor to engage the output shaft, as well as, a driver torque sensor intended to measure the torque exerted by the driver on the steering wheel and the steering column, and in that the carrier structure comprises a plurality of metallic, initially distinct casings which are contiguous and fastened to each other according to a stack which substantially follows the guiding axis, casings among which there is a steering casing, which accommodates and guides the drive pinion and the rack, a reducer casing, axially superimposed with the steering casing, which carries the assist motor and in which is housed the gear reducer, then, a sensor casing axially superimposed with the reducer casing, and which accommodates the driver torque sensor.

3. The device according to claim 2, wherein the stack of casings of the carrier structure is made without interposing, between the different adjacent casings which form said stack, attached sealing rings, and without interposing seals made of elastomer between adjacent casings belonging to said stack.

4. The device according to claim 2, wherein the steering casing, the reducer casing and the torque sensor casing are held together by means of at least one assembly screw, said at least one assembly screw being common to the three stacked casings, and acting as a tie member which pulls mutually the torque sensor casing and the steering casing toward each other, thus clasping the reducer casing between said sensor casing and said steering casing.

5. The device according to claim 1, wherein the second shell portion has a peripheral rim which conforms, according to a parting plane of the containment shell, and following the course of the sealed junction, to a corresponding peripheral rim of the at least one first shell portion in that said peripheral rim of the second shell portion is provided with at least one hooking rib which extends along said peripheral rim of the second shell portion, according to the course of the sealed junction, and which protrudes toward the at least one first shell portion with respect to the parting plane, and in that the peripheral rim of the at least one first shell portion is provided with at least one bonding groove which is arranged hollowed with respect to the parting plane so as to receive, on the one hand, the hooking rib and, on the other hand, a bonding material, which ensures the sealed fastening, by bonding, of the hooking rib in the bonding groove, so as to form by bonding a sealed junction between the second shell portion and the at least one first shell portion.

6. The device according to claim 5, wherein the residual volume of the at least one bonding groove, which subsists inside said at least one bonding groove when the respective hooking rib has penetrated into said at least one bonding groove and is in place in the at least one bonding groove, is larger than the volume of the bonding material introduced into the at least one bonding groove, in order to make the junction between the second shell portion and the at least one first shell portion, so that the lateral walls which border said bonding grooves form anti-overflow walls capable of containing said bonding material inside said at least one bonding groove during the set-up of the second shell portion on the at least one first shell portion.

7. The device according to claim 1, wherein at least one of a peripheral rim of the second shell portion and a peripheral rim of the at least one first shell portion comprises at least one snap tab, designed to engage the at least one first shell portion, and/or respectively the second shell portion, when the second shell portion is closed on the at least one first shell portion, so as to hold the second shell portion pressed against the at least one first shell portion.

8. The device according to claim 7, wherein the at least one snap-fit tab is formed integrally with the second shell portion, and extends the peripheral rim of said second shell portion overhanging outwardly of the hooking ribs, said at least one snap-fit tab being provided, with a hook arranged to engage against the peripheral rim of the at least one first shell portion, overhanging outwardly of the bonding grooves.

9. The device according to claim 1, wherein the actuator subassembly comprises an input shaft which is intended to be coupled to a steering column carrying a steering wheel, and which extends according to a guiding axis, and in that the parting plane of the containment shell, according to which the second shell portion conforms to the at least one first shell portion is secant to said guiding axis.

10. The device according to claim 1, wherein the second shell portion, and the at least one first shell portion, are made of plastic material.

11. The device according to claim 1, further comprising a planet guide bearing, distinct from the carrier structure, said planet guide bearing being disposed inside the containment shell, away from the carrier structure, and arranged to guide the rack in translation relative to said containment shell.

12. The device according to claim 11, wherein the planet guide bearing is provided with fastening members, intended to enable the fastening of the power steering device on the vehicle, through said containment shell, and in that an outer surface of the containment shell includes seat surfaces intended to come into contact with anchorage points belonging to the receiving structure of the vehicle, said seat surfaces being pierced with access orifices which pass across a thickness of the containment shell and open opposite the fastening members of the planet guide bearing, so as to enable the creation of a fastening link between, on the one hand, the anchorage points of the receiving structure of the vehicle receiving the steering device and, on the other hand, said fastening members belonging to the planet guide bearing housed in the containment shell.

13. The device according to claim 1, wherein the carrier structure is provided with fastening members, intended to enable the fastening of the power steering device on the vehicle, through the containment shell, and in that an outer surface of the containment shell includes seat surfaces intended to come into contact with anchorage points belonging to the receiving structure of the vehicle, said seat surfaces being pierced with access orifices which pass across the thickness of the containment shell and open opposite the fastening members of the carrier structure, so as to enable the creation of a fastening link between, on the one hand, the anchorage points of the receiving structure of the vehicle receiving the steering device and, on the other hand, said fastening members belonging to the carrier structure housed in the containment shell.

14. The device according to claim 13, wherein the access orifices pierced in the containment shell at the seat surfaces are oblong, according to a direction of translation of the rack, so as to enable, during the positioning of the carrier structure in the containment shell or, where appropriate, during the positioning of the planet guide bearing in said containment shell, the setting of the spacing distance (Dref) which separates, within said containment shell, the carrier structure from the planet guide bearing, so as to enable the adjustment of a half-stroke of the rack.

15. The device according to claim 1, wherein the second shell portion has, integrally with the portion of said second shell portion which covers the carrier structure, a coupling portion to the bulkhead which is arranged to bear against the bulkhead of the vehicle.

* * * * *